United States Patent [19]
Ohno et al.

[11] Patent Number: 5,492,658
[45] Date of Patent: Feb. 20, 1996

[54] GATE-CUT AND EJECTION CONTROL APPARATUS AND CONTROL METHOD FOR AN INJECTION MOLDING MACHINE

[75] Inventors: Masakazu Ohno, Tokyo; Yukio Yoshizawa, Nagaoka; Shoji Miyajima, Nagaoka; Sumio Sato, Nagaoka; Toshio Inage, Niigata; Motohiro Kobayashi, Nagaoka, all of Japan

[73] Assignee: Sankyokasei Kabushiki Kaisha, Tokyo, Japan

[21] Appl. No.: 356,207

[22] Filed: Dec. 19, 1994

[30] Foreign Application Priority Data

Apr. 20, 1993 [JP] Japan .................................. 5-093402
Jan. 26, 1994 [JP] Japan .................................. 6-007264

[51] Int. Cl.$^6$ ............................ B29C 45/38; B29C 45/40
[52] U.S. Cl. .................... 264/40.1; 264/161; 264/328.9; 264/334; 425/139; 425/142; 425/165; 425/556; 425/DIG. 51
[58] Field of Search .................................. 264/40.1, 161, 264/328.1, 328.7, 328.8, 328.9, 334; 425/139, 142, 165, 155, 554, 556, 562, 566, 571, DIG. 51

[56] References Cited

U.S. PATENT DOCUMENTS

| | | | |
|---|---|---|---|
| 4,208,176 | 6/1980 | Salerno | 425/139 |
| 4,878,824 | 11/1989 | Hara | 425/139 |
| 5,330,693 | 7/1994 | Takada | 264/161 |
| 5,356,283 | 10/1994 | Hamada et al. | 264/328.9 |
| 5,439,371 | 8/1995 | Sawaya | 425/556 |

FOREIGN PATENT DOCUMENTS

| | | | |
|---|---|---|---|
| 591983 | 4/1994 | European Pat. Off. | 425/139 |
| 60-247533 | 12/1985 | Japan . | |
| 62-103123 | 5/1987 | Japan . | |
| 62-117720 | 5/1987 | Japan | 425/139 |
| 63-11321 | 1/1988 | Japan | 425/556 |
| 271614 | 5/1990 | Japan . | |
| 5-228969 | 9/1993 | Japan | 425/555 |

*Primary Examiner*—Jill L. Heitbrink
*Attorney, Agent, or Firm*—Deveau, Colton & Marquis

[57] ABSTRACT

The present intention intends to operate an ejector which carries out gate cut and product ejection in an injection molding machine, at optimal speeds, respectively. According to the present invention, a control unit for controlling hydraulic or electric drive means for operating one or more than one ejector pin comprises operation speed setting means for gate cut and another operation speed setting means for product ejection. Such a structure enables to carry out gate cut by operating an ejector unit controlled by an ejector unit operation speed setting means for a gate cut and, subsequently, to carry out a product ejection from metallic molds by operating the ejector unit controlled by another ejector unit operation speed setting means for product ejection. The ejector unit is set at a comparatively high operation speed for gate cut so that no gate trace will remain, and at a comparatively low operation speed for product ejection so that no cracks will be generated in the product.

22 Claims, 20 Drawing Sheets

1

GATE-CUT AND EJECTION CONTROL APPARATUS AND CONTROL METHOD FOR AN INJECTION MOLDING MACHINE

FIELD OF THE INVENTION

The present invention relates to a gate-cut and product-ejection control apparatus and method for use in an injection molding machine wherein a melted substance is injected into metallic molds so as to produce a molded product.

BACKGROUND OF THE INVENTION

An injection molding machine for injecting a melted substance such as a synthetic resin by means of hydraulic pressure so as to produce molded products normally comprises components for carrying out a gate cut and a product injection which are carried out in different steps.

A conventional type of the injection molding machine carries out a gate cut and a product ejection by using the same ejector pin driven by a hydraulic ejector cylinder. In this case, the gate cut is performed by a full stroke of a hydraulic ejector and, after resin in a cavity is cooled down, the hydraulic ejector is again operated for ejecting a product.

Another type of the conventional injection molding machine is provided with a gate cut pin and an ejector pin. Immediately after the resin is injected or while pressure is applied, the gate cut pin is operated by the hydraulic ejector cylinder for carrying out a gate cut. After the gate cut is complete, the gate cut pin is returned to its initial position. Subsequently, after the resin in the cavity is cooled down, a product is ejected out by operating the gate cut pin and the ejector pin driven by the hydraulic ejector cylinder.

Either of the above-described types of the injection molding machine has a problem that the gate cut and the product ejection are carried out by operation of the hydraulic ejector at the same speed (flow) and pressure. That is, the gate cut may be carried at a speed and a pressure which have been appropriately set for the product ejection. In this case, the speed and the pressure are insufficient for carrying out the gate cut, resulting in that a gate trace will remain on the gate cut surface and a molding cycle is unnecessarily prolonged.

On the contrary, in the case when the hydraulic ejector operation is set at the speed and the pressure which are appropriate for the gate cut, the speed is too high for the product ejection and cracks may be generated in the product.

There is another problem that a typical hydraulic injection molding machine which has been recently developed is provided with a single electromagnetic flow control valve and a single electromagnetic pressure control valve for controlling speed (flow) and pressure of actuators, respectively, and incapable of simultaneously controlling the speed and the pressure of a plurality of actuators. Consequently, it is necessary to carry out resin injection, gate cut, and product ejection one after another, waiting for a certain time duration between each of the steps. This significantly prolongs the entire cycle of injection molding.

Moreover, when a gate cut as carried out, the resin of the gate cut portion should be pushed into either to the product side or to the sprue runner portion. If a resin pressure remains in the cavity, the gate portion can be cut off by increasing the pressure of the hydraulic ejector for operating the gate cut pin. However, if the injection molding machine is used for a long time in such a condition, the gate cut pin is tilted by the pressure resistance. This may cause defective products and rupture of the metallic molds. The sprue runner may not be easily removed from the metallic molds.

In the case when an electric mechanism is used as ejector driving means, it is similarly difficult to select a preferable speed for each of the gate cut and the product ejection.

In view of the above-described problems, a primary object of the present invention is to provide a gate-cut and ejection control apparatus and method for an injection molding machine which is capable of operating at a preferable speed and pressure for each of the gate cut and the product ejection.

Another object of the present invention is to provide a gate-cut and product ejection control apparatus and method for an injection molding machine which suppresses generation of defective products and rupture of metallic molds which may be caused by the resin pressure in the metallic molds.

DISCLOSURE OF THE INVENTION

A gate-cut and ejection control apparatus according to the present invention is intended for use in an injection molding machine wherein one or more than one ejector pins are operated by a hydraulic or electric ejector unit to carry out a gate cut in metallic molds and ejection of a product from the metallic molds, and characterised in that:

means for setting an ejector unit operation speed for a gate cut is provided separately from means for setting an ejector unit operation speed for a product ejection.

A gate-cut and ejection control method according to the present invention is intended for use in an injection molding machine wherein one or more than one ejector pins are operated by a hydraulic ejector unit to carry out a gate cut in metallic molds and ejection of at least a product from the metallic molds, and characterised in that:

means for setting an ejector unit operation speed for gate cut is used to operate the ejector unit for gate cut and means for setting an ejector unit operation speed for product ejection is used to operate the ejector unit for ejection of at least a product from the metallic molds.

It should also be noted that, according to the present invention, the operation speed for gate cut set by the ejector unit operation speed setting means for gate cut is higher than the operation speed set by the ejector unit operation speed setting means for product ejection.

Moreover, the gate-cut and ejection control apparatus according to the present invention is intended for use in an injection molding machine wherein the melted substance is injected into metallic molds by an injection cylinder at a single or multiple stages of speed and pressure set by electromagnetic flow control means and electromagnetic pressure control means, and one or more than one ejector pin are operated by a hydraulic ejector unit to carry out a gate cut in the metallic molds and ejection of at least a product from the metallic molds, and is characterised by comprising:

means for supplying the hydraulic ejector unit with the speed and the pressure set by the electromagnetic flow control means and the electromagnetic pressure control means after injecting the melted substance into the metallic molds, so that the hydraulic ejector unit is operated at the speed and the pressure for carrying out the gate cut.

Furthermore, the gate-cut and ejection control method according to the present invention is intended for use in an injection molding machine, wherein melted substance is injected into metallic molds from an injection cylinder at a single or multiple stages of speed and pressure set by electromagnetic flow control means and electromagnetic pressure control means and a hydraulic ejector unit operates one or more than one ejector pin to carry out a gate cut in the metallic molds and ejection of at least a product from the metallic molds, and is characterised in that:

after the melted substance is injected into the metallic molds, the hydraulic ejector unit is supplied with the speed and the pressure set by the electromagnetic flow control means and the electromagnetic pressure control means so that the hydraulic ejector unit is operated at the speed and the pressure for carrying out a gate cut.

According to such a configuration, the ejector unit is operated by the ejector unit operation speed setting means for gate cut so as to carry out a gate cut and, subsequently, the ejector unit is operated by the ejector unit operation speed setting means for product ejection so as to eject a product from the metallic molds.

As the ejector unit operation speed for gate cut is set at a comparatively high speed, no gate trace will remain in the product. As the ejector unit operation speed for product ejection is set at a comparatively low speed, no cracks will be generated in the product during the ejection.

Melted substance is injected from the injection cylinder into the metallic molds at the multiple stages of speed and pressure set by the electromagnetic flow control means and the electromagnetic pressure control means. Upon completion of the injection within a predetermined injection time, the ejector unit is supplied with a subsequent speed and pressure set by the electromagnetic flow control means and the electromagnetic pressure control means, under which the hydraulic ejector unit is operated for carrying out a gate cut.

The gate cut can be carried out smoothly with a minimum resistance of the resin pressure because it is carried out after a lapse of a predetermined time counted after the speed and pressure to be applied to the injection cylinder is cut off.

Furthermore, the gate-cut and ejection control apparatus according to the present invention is intended for use in an injection molding machine wherein one or more than one ejector pin is operated by an ejector member of an electric mechanism for carrying out a gate cut in metallic molds and a product ejection from the metallic molds, and is characterised by comprising:

error detecting means for cutting cuts off a drive source when a predetermined allowance is exceeded by a difference between an actual position and a target position set for the ejector member for operating the ejector pin; and error control means for switching off the error detecting means when a gate cut is to be carried out, and switching on the error detecting means when a product ejection is to be carried out.

Moreover, the gate-cut and ejection control method according to the present invention is intended for use in an injection molding machine wherein one or more than one ejector pin is operated by an ejector member of an electric mechanism for carrying out a gate cut in metallic molds and a product ejection from the metallic molds, and is characterised in that:

a gate cut is carried out by switching off the error detecting means for cutting off a drive source if a predetermined allowance is exceeded by a difference between a target position and an actual position of the ejector member for operating the ejector pins; and a product ejection is carried out by switching on the error detecting means.

When a gate cut is to be carried out, the error detecting means is automatically kept off by the error control means. Consequently, even when the ejector pin has reached the gate cut position before reaching the target position, the drive source continues operation without a stop because the difference between the target position and the actual position exceeds the allowance. Thus, the resin in the cavity is pushed continuously by the ejector pin even after the gate cut so that a preferable product can be obtained. When ejecting the product, the error detecting means is automatically kept on and operation of the ejector member is controlled by terminating the drive source when the difference between target position and the actual position exceeds the allowance.

The error detecting means is supplied with a signal from a comparator when the predetermined allowance is exceeded by the difference between the target position and the actual position of the ejector member, and the drive current supply to the drive source is cut off.

The error control means automatically cuts off current between the comparator and a switch of the error detecting means when a gate cut is to be carried out, and turns it on when a product ejection is to be carried out.

As the target position of the ejector unit is set so that the ejector pin is positioned further than the gate cut position, the drive source continues operation even after the ejector pin reaches the gate cut position. Consequently, a pressure is continuously applied to the resin in the cavity and preferable finishing of the product can be obtained.

As has thus far been described, in the gate-cut and ejection control apparatus and method according to the present invention, the ejector unit operation speed setting means for gate cut is provided separately from the ejector unit operation speed setting means for product ejection. Therefore, the ejector unit operation speed can be set at preferable values for each of the gate cut and the product ejection. The gate cut can be carried out in a reduced time without causing any gate trace on the gate cut surface, and the product ejection can be carried out without causing any cracks in the product.

Furthermore, in the injection molding machine using the gate-cut and ejection control apparatus and method according to the present invention, a speed and a pressure for post-resin-injection into the metallic molds are applied to the hydraulic ejector unit by the electromagnetic flow control means and the electromagnetic pressure control means so that a gate cut is carried out at this speed and pressure. Consequently, it is possible to carry out a gate cut at a high speed without using any additional component. During the gate cut, no gate trace is left on the gate cut surface. The time required for the gate cut step is significantly reduced. Product ejection can be carried out without generating any cracks in the product.

Moreover, the gate-cut and ejection control apparatus and method according to the present invention comprises means for cutting off the speed and pressure to be applied to the injection cylinder during a gate cut and means for carrying out a gate cut after a lapse of a predetermined time counted after the cut-off. Consequently, a gate cut can be carried out smoothly under a minimum resistance of the melted substance pressure. The gate cut pin will not be tilted by the pressure resistance even after a long period of usage. Thus, there is no problem of generation of defective products or rupture of the metallic molds due to a tilt of the ejector pin.

The gate-cut and ejection control apparatus according to the present invention further comprises ejector member operation speed setting means for gate cut and ejector member operation speed setting means for product ejection. Consequently, the gate cut and the product ejection can be set at appropriate operation speeds, respectively. That is, no gate trace will remain on the gate cut surface and no cracks will be generated in the products. A cycle of the gate cut step can be significantly reduced.

The gate-cut and ejection control apparatus according to the present invention further comprises error detecting means for cutting off the drive source if a predetermined allowance is exceeded by a difference between a target position and an actual position of the ejector member which operates the ejector pin, and error control means for switching off and on the error detecting means: off at a gate cut and on at a product ejection. Consequently, operation stop will not be caused by error detection even if the target position of the ejector member for gate cut is set further than the stroke distance of the gate cut operation. Thus, a pressure is continuously applied to the melted substance in the cavity and a product of preferable finish can be obtained regardless of the target position setting.

Thus, it is possible to automatically control operation start and stop of the error detecting means without applying any additional novel structure to the conventional drive mechanism. That is, it is possible to carry out preferable gate cut and preferable product ejection without complicating the configuration.

PREFERRED EMBODIMENTS

Description will now be directed to preferred embodiments of the present invention with reference to the attached drawings.

Figure 1:
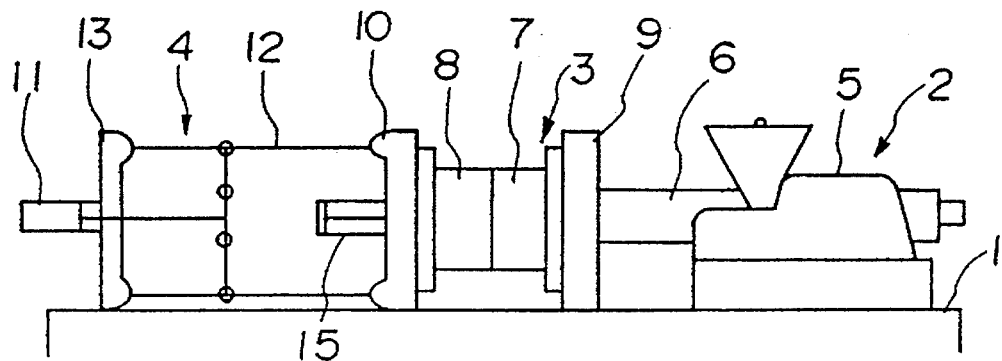
FIG. 1 is a front view of essential components of an ordinary injection molding machine to which the present invention is applied.
Figure 2:
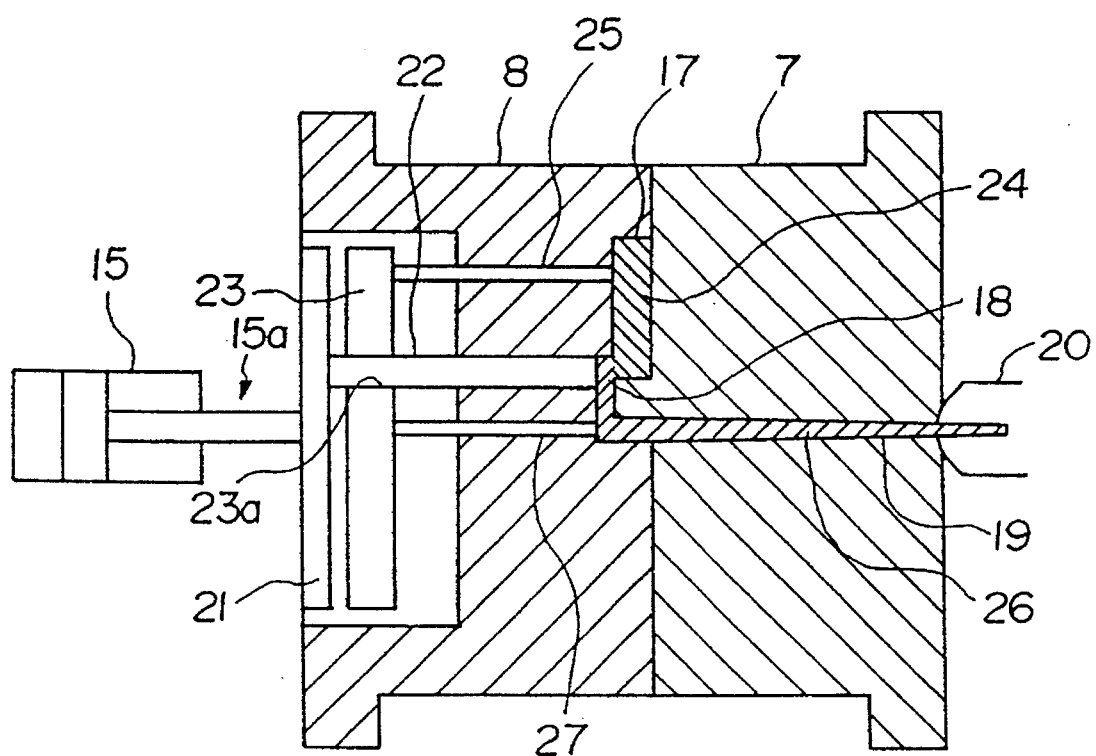
FIG. 2 is a cross section of the metallic mold portion of FIG. 1.
Figure 3:
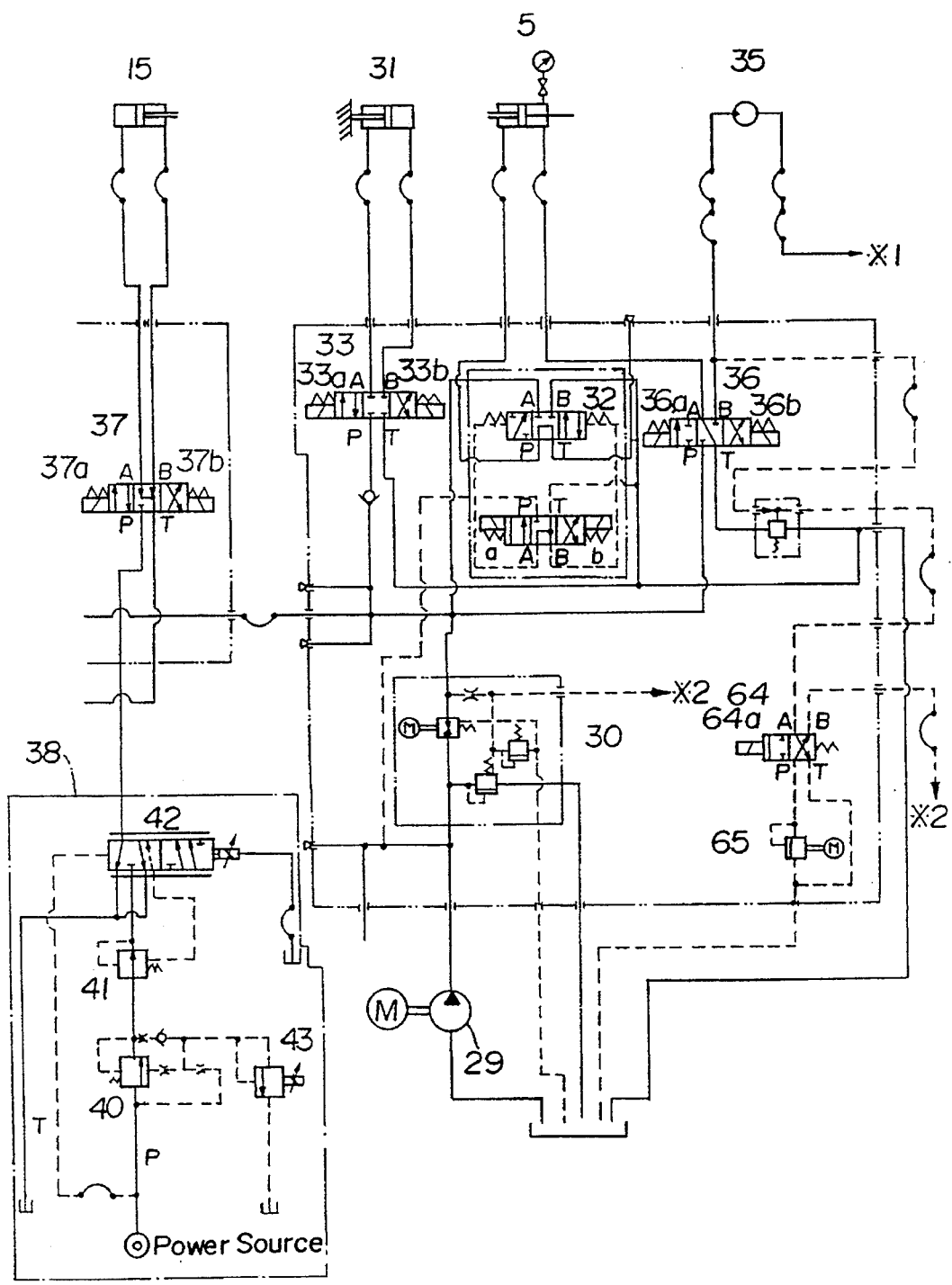
FIG. 3 illustrates the essential portion of the hydraulic circuit of the control unit of the injection molding machine according to a first embodiment of the present invention.
Figure 4:
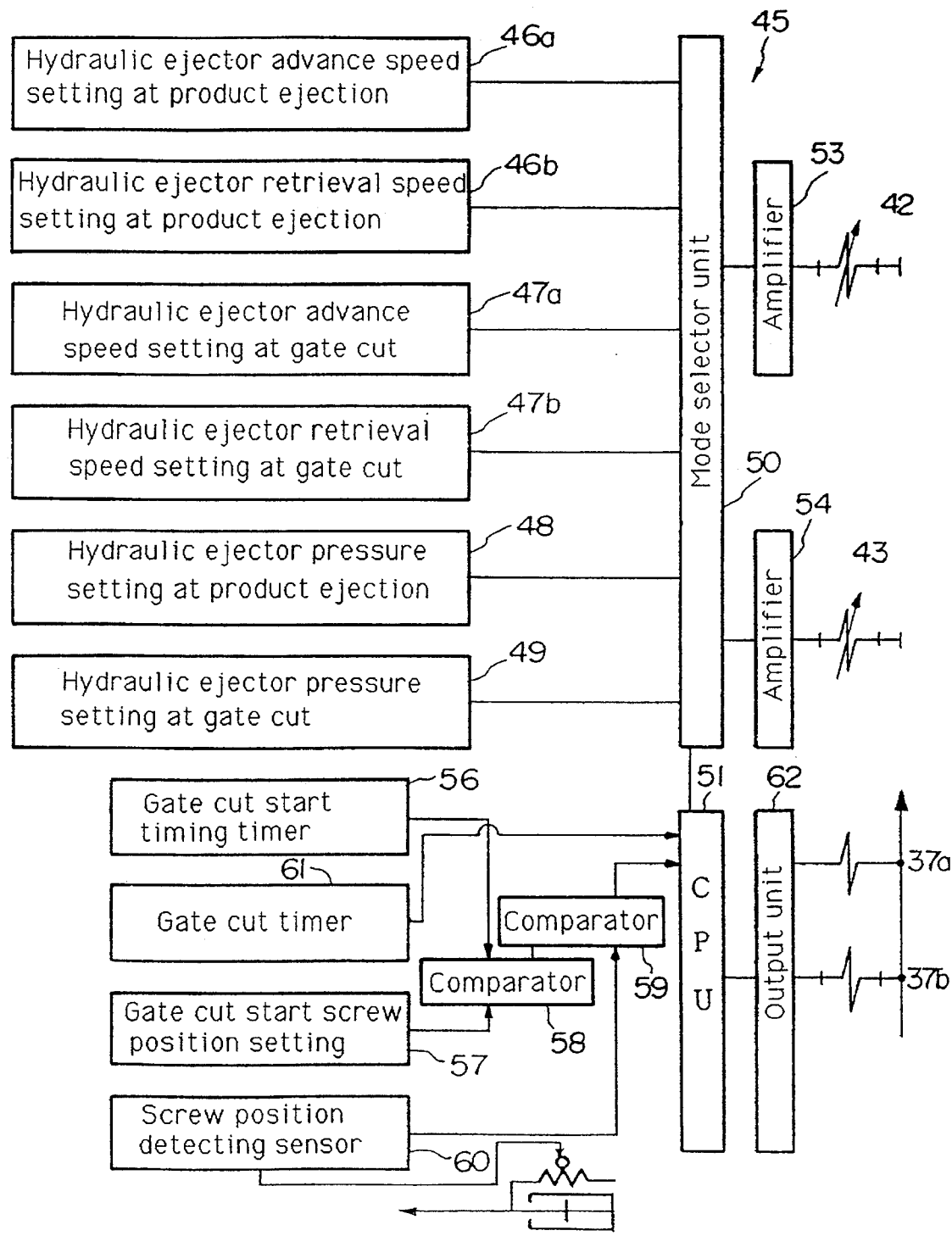
FIG. 4 is a block diagram of the control unit of FIG. 3.
Figure 5:
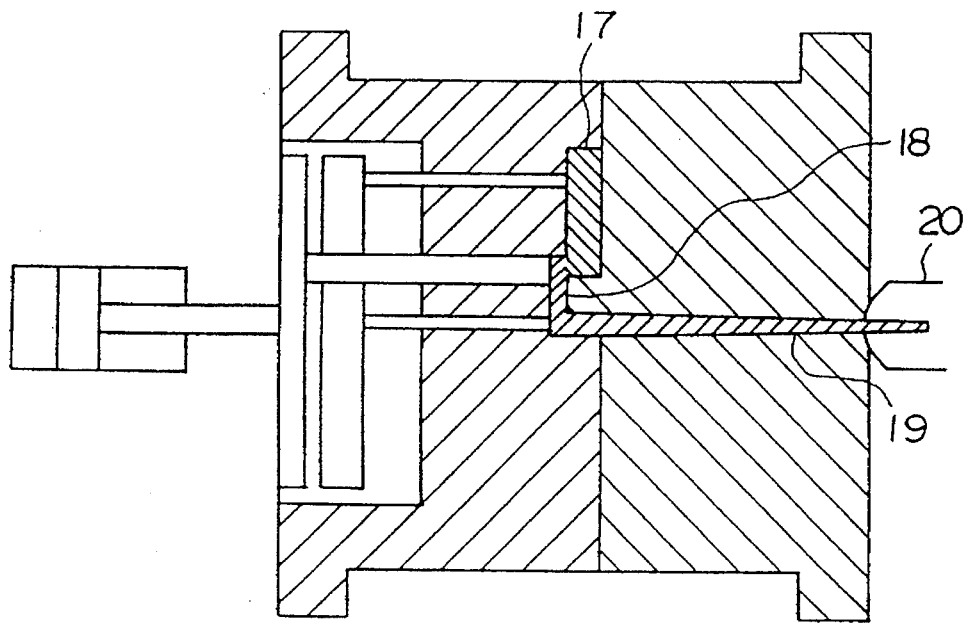
FIG. 5 is a cross section of the metallic mold portion of FIG. 1.
Figure 6:
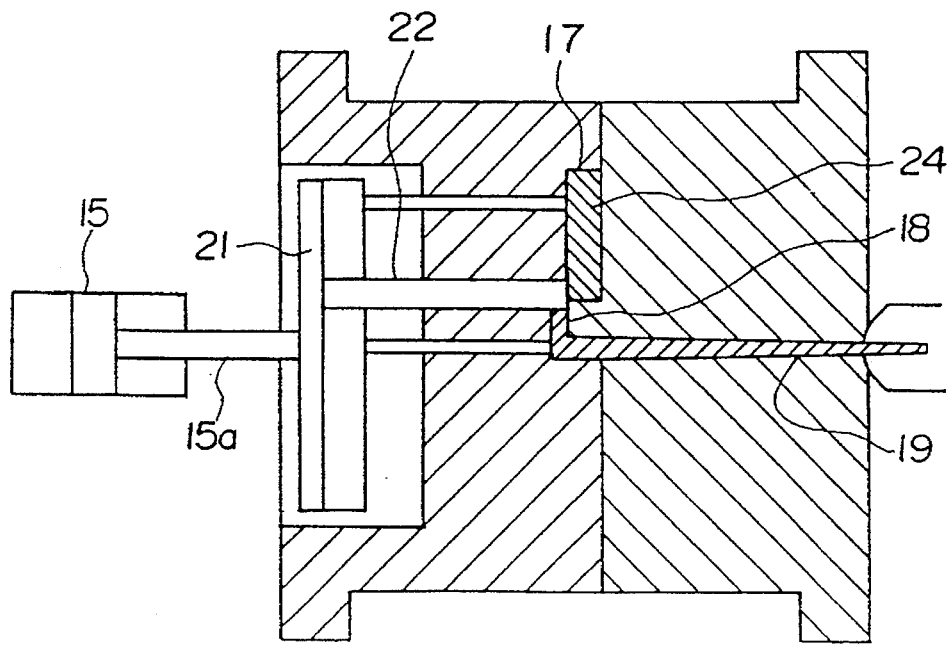
FIG. 6 is a cross section of the metallic mold portion during gate cut.

FIG. 1 through FIG. 9 relate to a first embodiment. FIG. 1 is a front view of essential components of an injection molding machine in a closed state. FIG. 2 is a cross section of the metallic mold portion of FIG. 1. FIG. 3 illustrates a hydraulic circuit of a control unit of the injection molding machine according to the first embodiment. FIG. 4 is a block diagram illustrative of operation of the control unit of FIG. 3. FIG. 5 through FIG. 9 are cross sections of the metallic mold portions, showing steps of a gate cut and a product ejection.

The injection molding machine illustrated in FIG. 1 is a horizontal injection molding machine, for example, of an inline screw type, comprising an injection unit 2, a metallic mold unit 3, and a closing unit 4 which are mounted on a machine frame 1. The injection unit 2 is provided with an injection cylinder 5 and a heating cylinder 6. The metallic mold unit 3 comprises two opposing metallic molds 7 and 8 secured on a fixed plate 9 and a moving plate 10, respectively. The closing unit 4 comprises a closing hydraulic cylinder 11 and a toggle mechanism 12 for shifting the moving plate 10 in relation to the fixed plate 9 so as to perform closing and opening.

The hydraulic cylinder 11 and the toggle mechanism 12 are secured on an end plate 13. The end plate 13 is connected through a plurality of tie rods (not depicted) to the fixed plate 9. The moving plate 10 is slidably fixed on the tie rods. The moving plate 10 is provided with a hydraulic ejector cylinder 15 which drives an ejector pin (see FIG. 2) provided on the metallic mold 8 of the moving plate 10.

in the cross section of the metallic mold portion of FIG. 2, a cavity 17 is formed between the metallic molds 7 and 8 which are in a closed state. The cavity 17 is communicated through a gate 18 with a sprue 19 of the metallic mold 7. The sprue 19 is connected to a nozzle 20 of the heating cylinder 6 for injection of the melted. The hydraulic ejector cylinder 15 comprises a hydraulic ejector unit 15a connected to a first eject panel 21 in the other metallic mold 8 so that a gate cut pin 22 mounted on the first eject panel 21, passing through a thrust hole 23a of a second eject panel 23, can advance and retrieve in the gate 18.

Moreover, the second eject panel 23 is provided with a first eject pin 25 for ejecting a product and a second eject pin 27 for ejecting a sprue runner.

During a gate cut, the hydraulic ejector unit 15a moves the first eject panel 21 to be brought into abutment with the second eject panel 23 so that the tip of the gate cut pin 22, cutting off the gate 18 from the outer wall of the gate 18, is positioned on a surface of the cavity 17.

During a product ejection, the hydraulic ejector unit 15a drives the first eject panel 21 to push the second eject panel 23 so that the gate cut pin 22 and the first and the second eject pins 25 and 27 eject the product 24 and the sprue runner 26, respectively, out of the metallic mold 8.

Description will now be directed to the hydraulic circuit of the control unit of the injection molding machine of FIG. 1 with reference to FIG. 3 and FIG. 4.

In FIG. 3, oil is supplied through a hydraulic pump 29 with its flow controlled by an electromagnetic flow control valve 30 before being branched to flow paths reaching a feed cylinder 31 which controls advance and retrieval of the nozzle 20 to/from the metallic models 7 and 8, the injection cylinder 5, and a screw rotation hydraulic motor 35.

Figure 11:
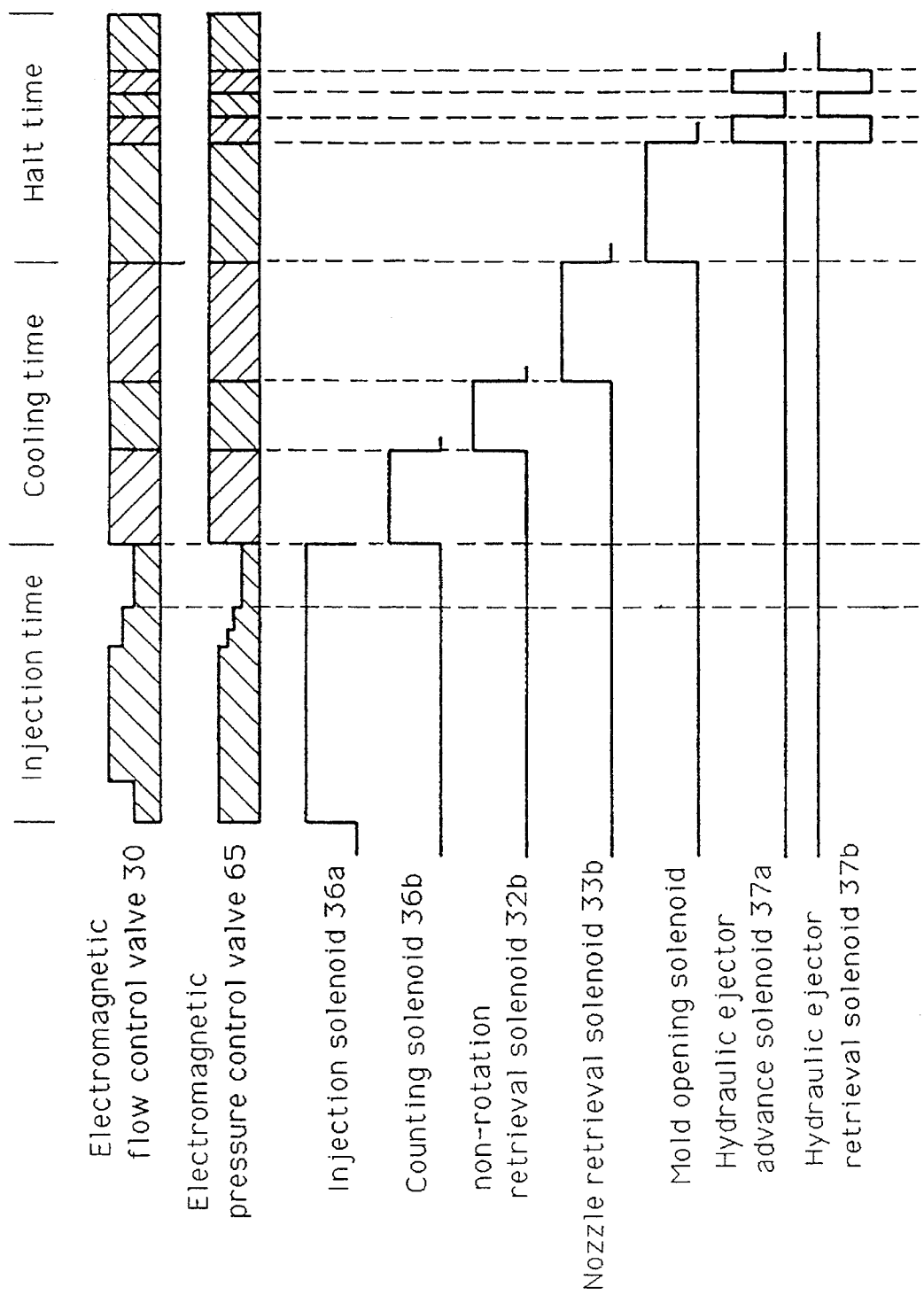
FIG. 11 is an ordinary timing chart of actuators during injection moulding.

In order to control operation speed of the injection cylinder 5 and others, the electromagnetic flow control valve 30 controls the flow, i.e., the speed, in multiple stages, for example, in four stages of speed, according to the injection time as illustrated in the timing chart of FIG. 11. Electromagnetic valves 32, 33, 36 and others are provided between the hydraulic flow path branching points and the injection cylinder 5, the feed cylinder 31, and the screw rotation hydraulic motor 35, respectively. The electromagnetic valves 32 and 33 can switch operation directions of the hydraulic cylinders 5 and 30, respectively.

Moreover, the hydraulic circuit is provided with a back pressure valve 64 and an electromagnetic pressure control valve 65 which control the hydraulic pressure of the circuit in multiple stages, for example, in four pressure stages. The pressure control valve 65 is connected through the back pressure valve 64 to the electromagnetic flow control valve 30. Thus, the hydraulic pressure supplied from the electromagnetic flow control valve 30 to the injection cylinder 5 can be controlled in four stages of injection speed (flow) and pressure.

Furthermore, the hydraulic circuit of the hydraulic ejector cylinder 15 has a separate hydraulic power source independent of the above-described hydraulic circuit and is provided with an electromagnetic switching valve 37 for switching between advance and retrieval of the hydraulic ejector unit 15a and a control unit 38. The electromagnetic switching valve 37 comprises an advance solenoid 37a and a retrieval solenoid 37b which are turned on and off for operation of the hydraulic ejector unit 15a.

In the control unit 38, the hydraulic pressure is set by a pressure reducing valve 40 connected to the hydraulic power source and connected through a pressure compensating valve 41 to an electromagnetic flow control valve 42 for setting the operation speed of the hydraulic ejector unit 15a. The hydraulic pressure with a flow set by the electromagnetic flow control valve 42 is connected to the electromagnetic switching valve 37. The pressure reducing valve 40 is connected to an electromagnetic relief valve 43.

FIG. 4 illustrates control means 45 for controlling the hydraulic circuit of the hydraulic ejector cylinder 15.

The control means 45 comprises a mode selector unit which is connected to the following components: hydraulic ejector unit advance speed setting means 46a and hydraulic ejector unit retrieval speed setting means 45b for product ejection, hydraulic ejector unit advance speed setting means 47a and hydraulic ejector unit retrieval speed setting means 47b for gate cut, hydraulic ejector unit pressure setting means 48 for a product ejection and hydraulic ejector unit pressure setting means 49 for a gate cut. The mode selector unit 50 is also connected to a CPU 51 of the injection molding machine.

The operation speed of the hydraulic ejector unit 15a for gate cut is set at a higher speed than the operation speed of the hydraulic ejector unit 15a for product ejection so that no trace will be left from the removed gate. The operation speed for product ejection is set at a lower speed so that no cracks will be generated.

The flow amount which has been set in the mode selector unit 50 for a product ejection or a gate cut is supplied through an amplifier 53 to the electromagnetic flow control valve 42. The hydraulic pressure which has been set for a product ejection or a gate cut is supplied through an amplifier 54 to the electromagnetic relief valve 43 for control.

A selector switch 58 is connected to a gate cut start timing timer 56 and a gate cut start screw positioner 57. The gate cut start timing is triggered normally by detection of a screw position, or by count of an injection time, or through a combination of the both, one of which is selected by the gate cut start timing timer 56. The selector switch 58 is further connected to a comparator 59 which is supplied with a signal from the gate cut start screw positioner 57 and a screw position signal from a screw position detecting sensor 60 so that these two signals are compared to each other. An output from the comparator 59 and a signal from a gate cut timer 61 are both supplied to the CPU 51. When the screw position which has been detected matches with the position which has been set, a gate cut operation is specified and counting of the gate cut time is started.

The CPU 51 controls an output unit 62 to produce a start signal either to the advance solenoid 37a or the retrieval solenoid 37b of the hydraulic ejector unit 15a.

The first embodiment of the present invention is constructed as thus far has been described. Description will now be directed to a control method of the first embodiment with reference to FIG. 5 through FIG. 9 which illustrate a gate cut procedure and a product ejection procedure.

When the two metallic molds 7 and 8 of the injection molding machine are closed, the injection means 2 starts operation to operate the injection cylinder 5 to inject melted resin from the heating cylinder 6 through the nozzle 20 into the sprue 19 of the metallic molds 7 and 8, the gate 18, and the cavity 17 until they are filled with the melted resin. (See FIG. 5)

Meanwhile, the gate cut start timing timer 56 operates as follows. If detection of the screw position has been selected, for example, as a trigger of the gate cut start timing, the detection signal is supplied through the selector switch 58 and the comparator 59 to the CPU 51. Subsequently, the selector switch 58 is switched to receive a signal from the gate cut start screw positioner 57.

In the comparator 59, the signal from the gate cut start screw positioner 57 is compared to the screw position signal from the screw position detecting sensor 60. When these two signals are matched with each other, the comparator 59 produces a signal to the CPU 51. Upon reception of this signal, the CPU 51 supplies a gate cut specifying signal to the selector unit 50 and to the output unit 62.

Incidentally, in the case when the injection time count has been selected as the trigger of the gate cut start timing, the above-described operation is replaced by counting of the injection time. In the case when the combination of the screw position detection and the injection time counting has been selected as the trigger of the gate cut start timing, the injection time counting is started in addition to the above-described operation.

The output unit 62 turns on the advance solenoid 37a of the electromagnetic valve 37. Simultaneously with this, the mode selector unit 50 selects a signal from the advance speed setting means 47a of the hydraulic ejector unit 15a for a gate cut and a signal from the pressure setting means 49 of the hydraulic ejector unit 15a for a gate cut so as to be supplied to the electromagnetic flow control valve 42 and to the electromagnetic relief valve 43, respectively. According to these signals, the speed (flow) and the hydraulic pressure of the hydraulic circuit for a gate cut are determined so as to set the speed of the hydraulic ejector unit 15a of the hydraulic ejector cylinder 15 at a value corresponding to the gate cut.

Immediately after the resin injection is complete or while a pressure is applied, the hydraulic ejector unit 15a is actuated and the first eject panel 21 starts operation at a comparatively high speed. The gate cut pin 22 moves forward to crush the gate 18 and the pin end is held on the surface of the cavity 17. (See FIG. 6.)

Figure 7:
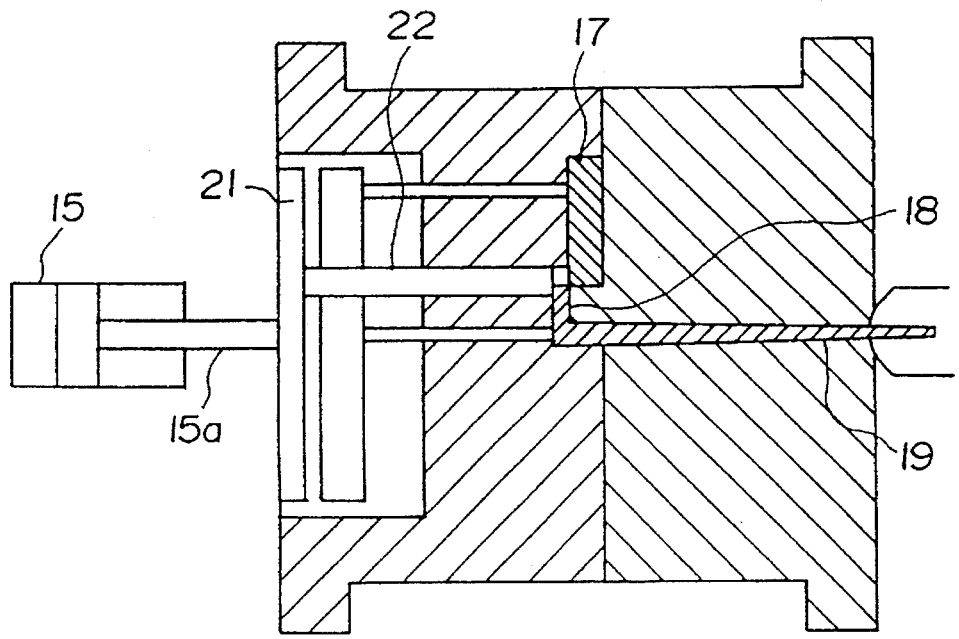
FIG. 7 is a cross section of the metallic mold portion with a gate cut pin at its initial position.

When the time counted by the gate cut timer 61 matches with a predetermined time which has been set, the electromagnetic valve 37 turns off its hydraulic ejector unit advance solenoid 37a and turns on its retrieval solenoid 37b. Simultaneously with this, the mode selector unit 50 is supplied with a signal from the hydraulic ejector unit retrieval speed setting means 47b for the gate cut and a signal from the hydraulic ejector unit pressure setting means 49 for the gate cut so as to move the hydraulic ejector unit 15a backward at a predetermined speed and a predetermined pressure, and the first eject panel 21 and the gate cut pin 22 are returned to their initial positions as illustrated in FIG. 7.

Figure 8:
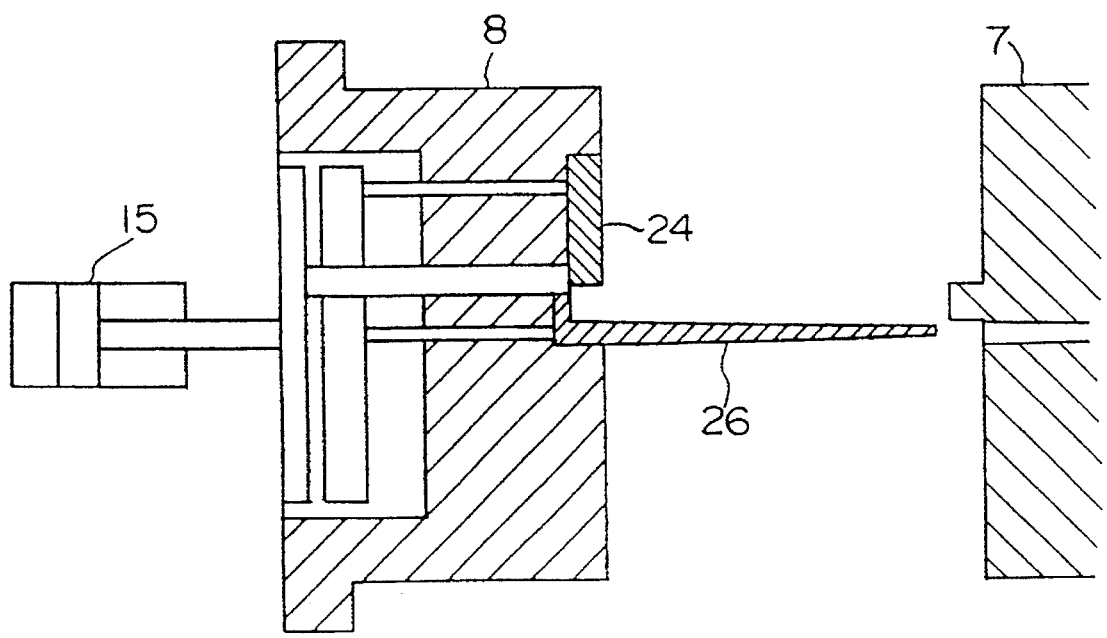
FIG. 8 is a cross section of the metallic mold portion in an open state.

After a lapse of a predetermined cooling time, the metallic molds starts opening (see FIG. 8). When the opening is complete, the CPU 51 of the injection molding machine specifies through the output unit 62 to turn on the advance solenoid 37a of the electromagnetic valve 37. The mode selector unit 50 is supplied with a signal from the hydraulic ejector unit advance speed setting means 46a for product ejection and a signal from the hydraulic ejector unit pressure setting means 48 for product ejection and determines the speed (flow) and pressure of the hydraulic circuit, which are supplied as control signals to the electromagnetic flow control means 42 and the electromagnetic relief valve 43, respectively. By these signals, the hydraulic ejector unit 15a is actuated to push the first eject panel 21 at a comparatively low speed for a long stroke and the second eject panel 23 together with the first eject panel 21.

Figure 9:
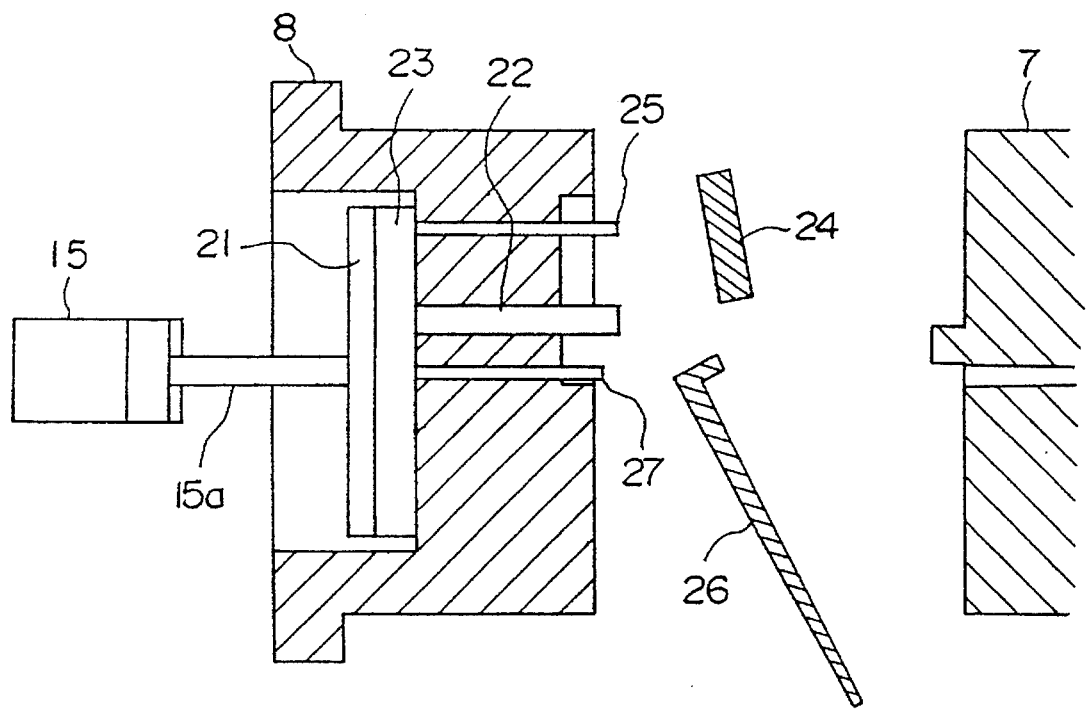
FIG. 9 is a cross section of the metallic mold portion in an eject state.

Subsequently, a product is ejected from the metallic molds by the gate cut pin 22 and the first eject pin 25 while the second eject pin 27 ejects the sprue runner 26 (see FIG. 9).

In the above-described embodiment, the speed (flow) and pressure of the hydraulic circuit of the ejector cylinder 15 are set automatically. However, it is also possible to manually set the speed (flow) and pressure for the gate cut and the product ejection by using a throttle valve, a pressure reducing valve, an electromagnetic valve, and others in combination.

As has thus far been described, according to the first embodiment of the present invention, it is possible to set the operation speed of the hydraulic ejector unit 15a for a gate cut, i.e., the speed (flow) and the pressure of the hydraulic circuit of the hydraulic ejector cylinder 15 at optimal values independently of the speed and the pressure for ejecting the product 24 and the sprue runner 26. This means that the gate cut pin 22 can carries out a gate cut at a speed appropriate for the gate cut, and no gate cut trace will be left on the gate cut surface. Additionally, a cycle of the entire gate cut step is significantly reduced. As for the ejection of the product 24 and others, it is possible to operate the pins 22, 25, and 27 at a lower speed appropriate for the ejection without causing any cracks in the product.

Figure 10:
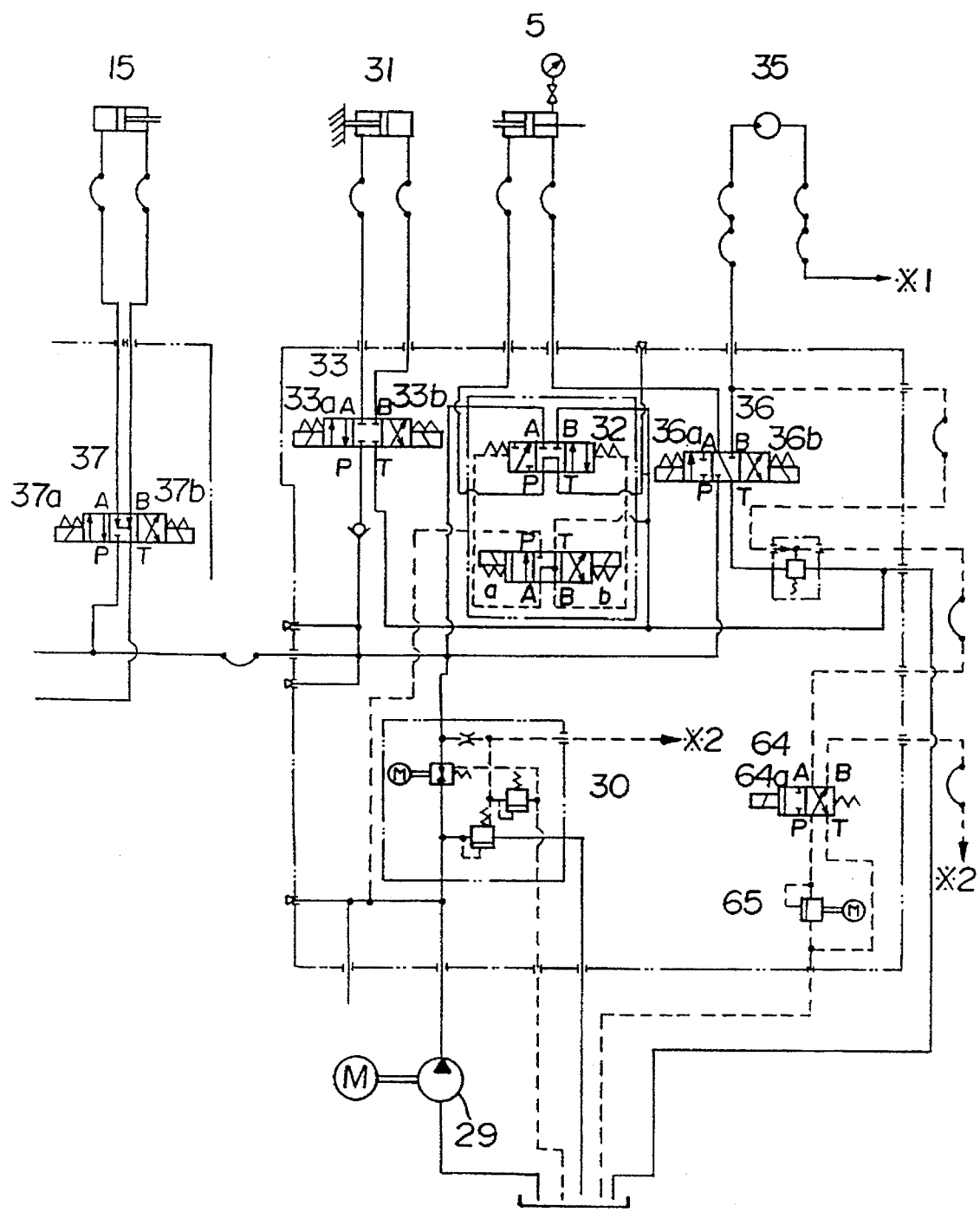
FIG. 10 illustrates the essential portion of the hydraulic circuit of the control unit of the injection molding machine according to a second embodiment of the present invention.
Figure 12:
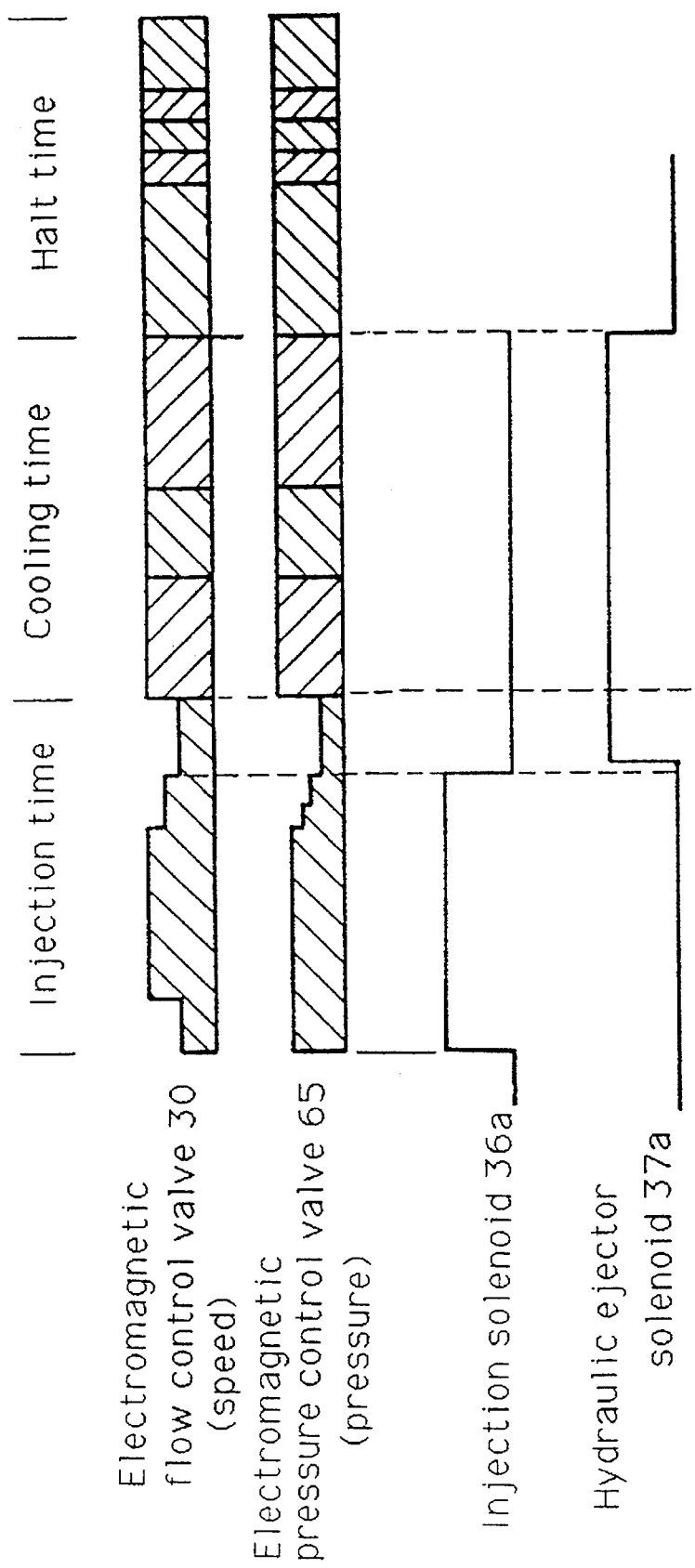
FIG. 12 is a timing chart of an injection solenoid of an electromagnetic valve and a advancing solenoid during injection molding according to the second embodiment.

Description will now be directed to a second embodiment of the present invention with reference to FIG. 10 through FIG. 12.

FIG. 10 illustrates arrangement of essential components of a hydraulic circuit according to the second embodiment. FIG. 11 is an ordinary timing chart of the injection molding procedure. FIG. 12 is a timing chart of an injection solenoid and a hydraulic ejector unit advance solenoid according to the second embodiment which corresponds to the timing chart of FIG. 11.

In FIG. 10, the hydraulic circuit of the injection molding machine according to the second embodiment differs from that of the first embodiment in that the hydraulic ejector cylinder 15 is connected not to the control unit 38 but to a hydraulic flow path at a downflow side of the electromagnetic flow control valve 30.

As shown in FIG. 11, in a conventional apparatus, during injection of melted resin, the operation speed and pressure of each of the actuators is controlled in multiple stages by means of a speed (flow) and a pressure regulated by the electromagnetic flow control valve 30 and the electromagnetic pressure control valve 65 for the injection cylinder 5. However, no control is operated on the electromagnetic flow control valve 30 and the electromagnetic pressure control valve 65 at the final stage of the injection because the injection/filling into the metallic molds has been completed in the preceding stages.

According to the second embodiment of the present invention, as illustrated in FIG. 12, control is made to switch off the injection solenoid 36a of the electromagnetic valve 36 in the final stage of the resin injection into the metallic molds, and, after a certain time lag, to switch on the advance solenoid 37a of the electromagnetic valve 37 through the hydraulic circuit of the hydraulic ejector cylinder 15.

Thus, the final stage of the oil speed (flow) and the pressure in the electromagnetic flow control valve 30 and the electromagnetic pressure control valve 54 are supplied to the hydraulic ejector cylinder 15 for controlling the injection cylinder 5. This makes it possible to control the operation speed of the ejector unit 15a during a gate cut to be set at a higher speed than the operation speed during a product ejection (set similarly as in the conventional apparatus).

According to the second embodiment, the speed (flow) and pressure of the electromagnetic flow control valve 30 and the electromagnetic pressure control valve 65 to be applied to the hydraulic eject cylinder 15 for operating the injection cylinder are controlled in four stages (a single stage of speed and pressure may also be used), and the final stage of speed (flow) and pressure is used for a gate cut. However, it is also possible to set multiple stages of the speed (flow) and pressure to be applied for a gate cut after the metallic molds are filled with the melted resin.

For example, in multiple-stage injection setting, it is possible to apply two of the four stages for injection and the other two stages for the hydraulic ejector unit for gate cut.

The above-described switching is controlled by the CPU of the injection molding machine as illustrated in the timing chart of FIG. 12.

Thus, in the second embodiment, the operation speed of the hydraulic ejector unit 15a during a gate cut can be controlled by those values of the injection speed (flow) and pressure in the electromagnetic flow control valve 30 and in the electromagnetic pressure control valve 65 which are to be used after filling of the melted resin. Consequently, it is possible to obtain the same functional effect as the first embodiment without adding any novel controller. This also brings about merits of reduction in the manufacturing cost and the installation space.

Incidentally, for a gate cut, it is necessary to introduce the melted resin of the gate 18 portion either into the product or the sprue runner by using the gate cut pin 22.

Figure 13:
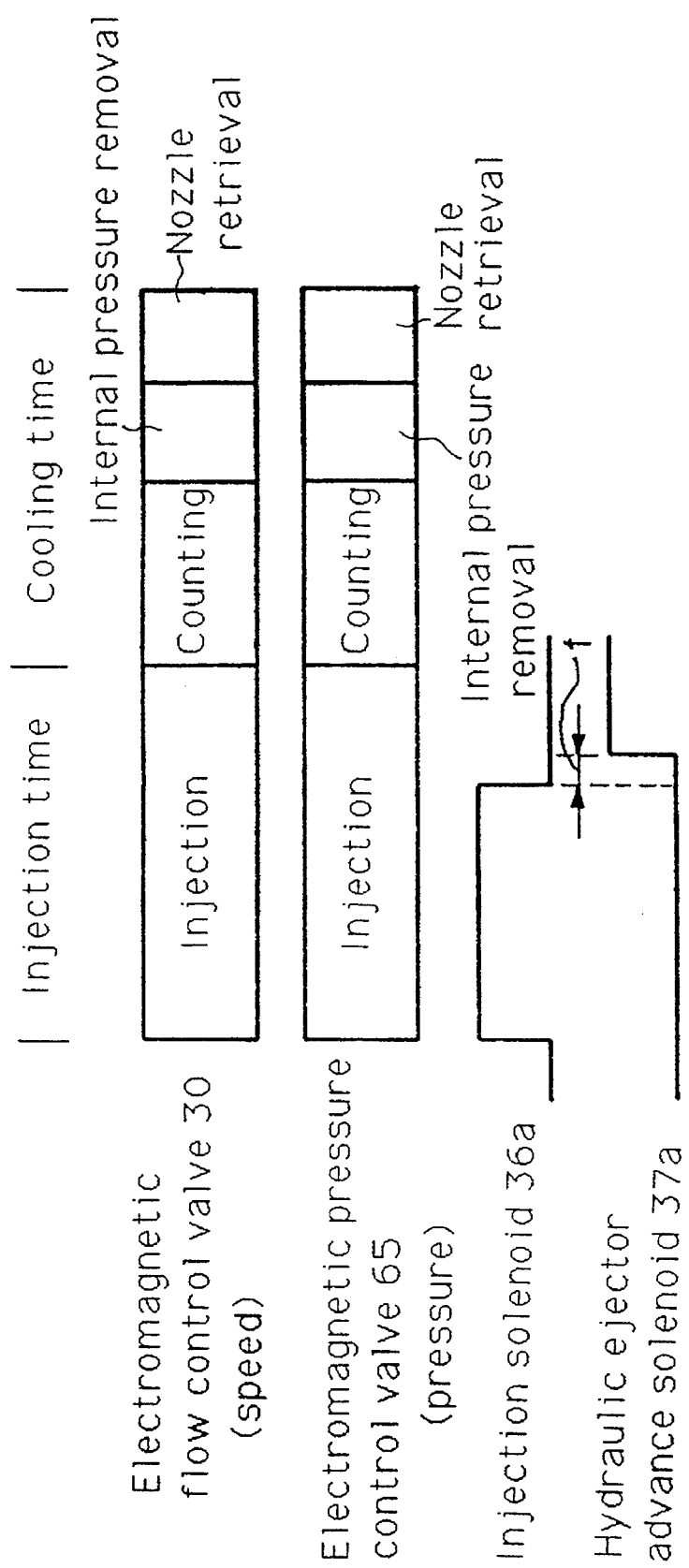
FIG. 13 is a timing chart of actuators during gate cut according to a third embodiment.

For example, as illustrated in FIG. 13, it is also possible to control the operation speed of the hydraulic ejector unit 15a during a gate cut by switching off the injection solenoid 36a of the electromagnetic valve 36 in the middle of the injection time duration and, after a certain time lug t, turning on the advance solenoid 37a of the electromagnetic valve 37 through the hydraulic circuit of the hydraulic ejector cylinder 15 so as to actuate the hydraulic ejector unit 15a at the speed (flow) and pressure for the injection cylinder.

In this case, the resin pressure in the cavity 17, the gate 18, and the sprue 26 can be reduced by the time lug t after switching off the injection solenoid 36a of the electromagnetic valve 36. As the advance solenoid 37a of the electromagnetic valve 37 is turned on after a lapse of the time lug t, the gate cut can be performed under a condition that the resin pressure in each of the portions has been reduced almost to zero.

The timing to turn off the injection solenoid 36a and the timing to turn on the advance solenoid 37a after a lapse of time t are controlled by the CPU of the injection molding machine.

Consequently, it is possible to perform the gate cut smoothly without increasing the pressure to be applied to the hydraulic ejector unit 15a. Even after a long-time use of the injection molding machine, there will be no trouble of tilting the gate cut pin 22 which may cause defective products or rupture of the metallic molds.

Figure 14:
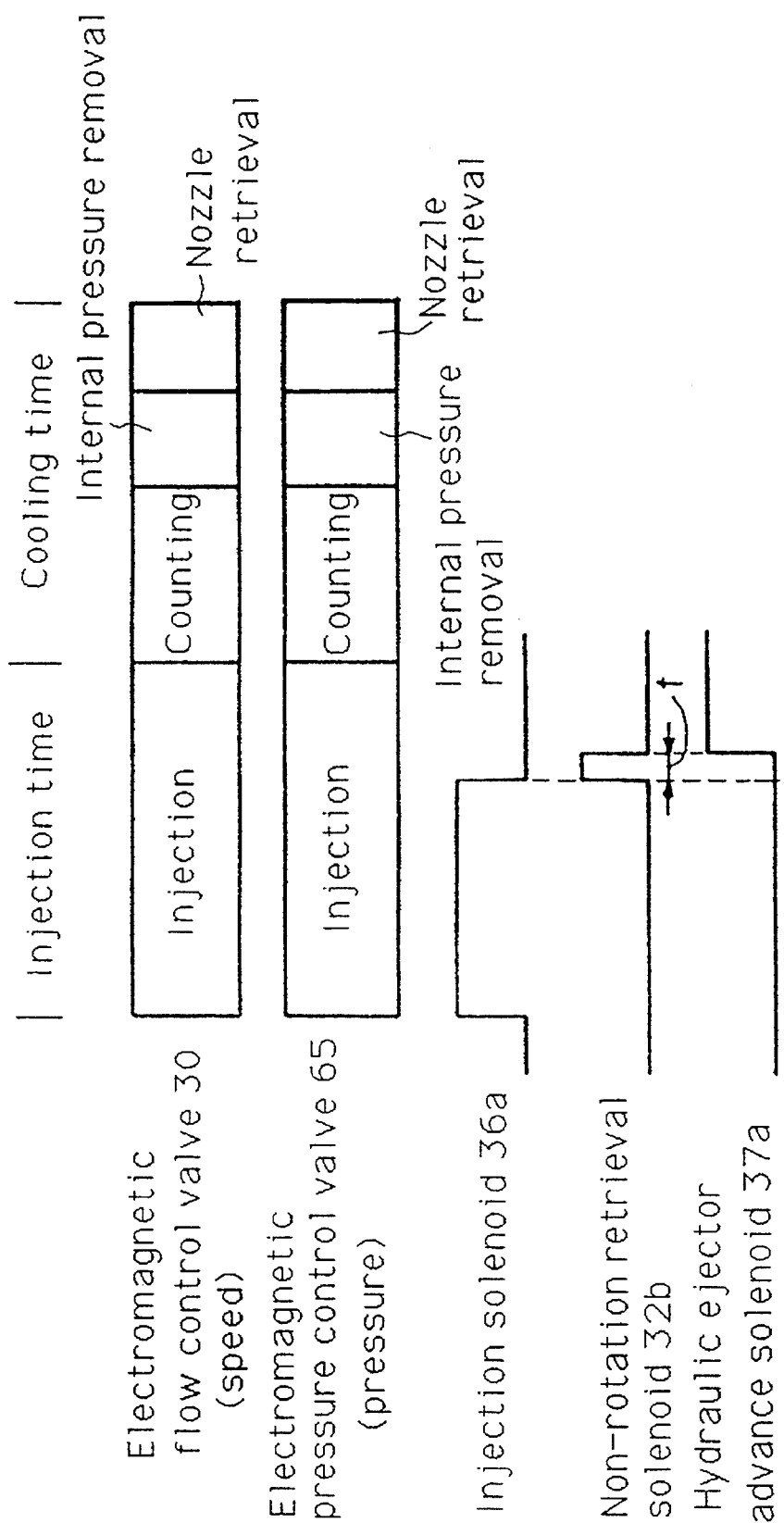
FIG. 14 is a timing chart of a first modification of the third embodiment of FIG. 13.

The above-described structure may be modified as illustrated in FIG. 14. In addition to the switching off of the injection solenoid 36a and, after a certain time lug t, switching on of the advance solenoid 37a as illustrated in FIG. 13, it is possible to keep the retrieval solenoid 32b of the electromagnetic valve 32 on in the hydraulic circuit of the injection cylinder 5 for the time lug t as illustrated in FIG. 14.

In this way, a screw in the heating cylinder 6 retrieves without rotation and the resin pressure in the nozzle 20 becomes negative. During a gate cut, the resin in the gate 18, being pushed by the gate cut pin 22, can easily be returned to the side of the sprue runner 26.

Figure 15:
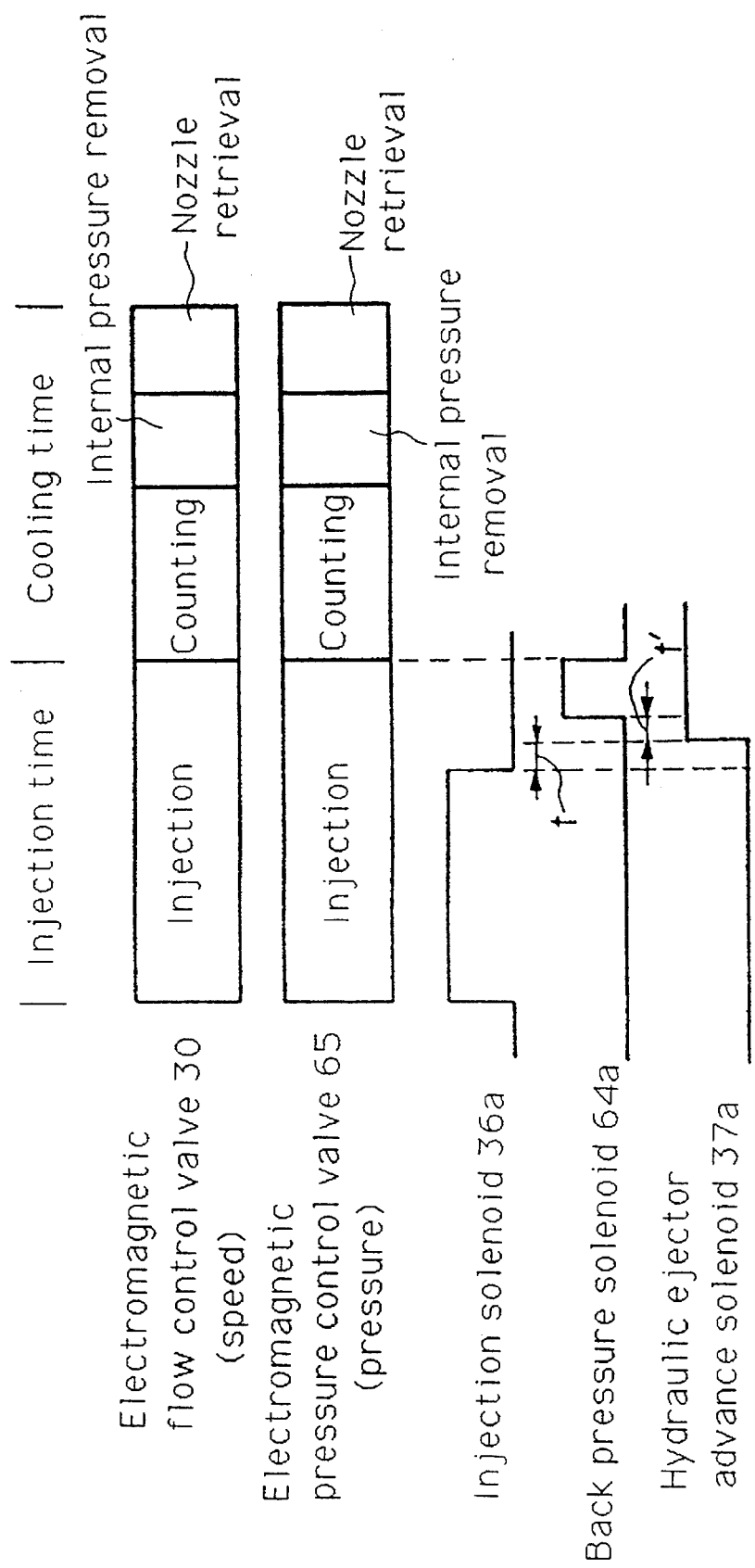
FIG. 15 is a timing chart of a second modification of the third embodiment of FIG. 13.

Furthermore, the above-described structure may also be modified as illustrated in FIG. 15. In addition to the switching off of the injection solenoid 36a and, after a certain time lug t, turning on of the advance solenoid 37a illustrated in FIG. 13, it is possible to keep the back pressure solenoid 64a of the back pressure valve 64 on in the hydraulic circuit for a time t' after the lapse of the time lug t, so as to apply a back pressure to the injection cylinder.

Thus, the resin in the gate 18, being pushed by the gate cut pin 22, is returned to the side of the sprue 19 after the gate cut is started. At the same time, as a back pressure is applied in the heating cylinder 6 by the injection cylinder 5 for the time t', the resin pressure in the sprue 19 is kept at a low positive pressure and the resin density becomes comparatively high in the sprue 19. Consequently, in addition to the above-mentioned merits not to cause defective products or rupture of metallic molds, there is another merit that the resin of the sprue runner 26 can easily be removed from the metallic molds.

The second embodiment of the present invention which has been described with reference to FIG. 13 through FIG. 15 is not limited to the structures illustrated therein but can be applied to other modifications of the injection molding machine including the conventional type of the injection molding machine.

That is, the essential structure is such that, during a gate cut, its is possible to turn off the injection solenoid 36a to reduce the melted resin pressure in the gate 18 and, after a time lug t, to turn on the advance solenoid 37a so as to actuate the hydraulic ejector unit 15a.

It should be noted that the gate cut pin 22, the first and the second ejector pins 25 and 27 all function as ejector pins.

Description will now be directed to a third embodiment of the present invention with reference to FIG. 16 through FIG. 22, wherein like components are denoted by like reference numerals. Explanation of those components is omitted below.

Figure 16:
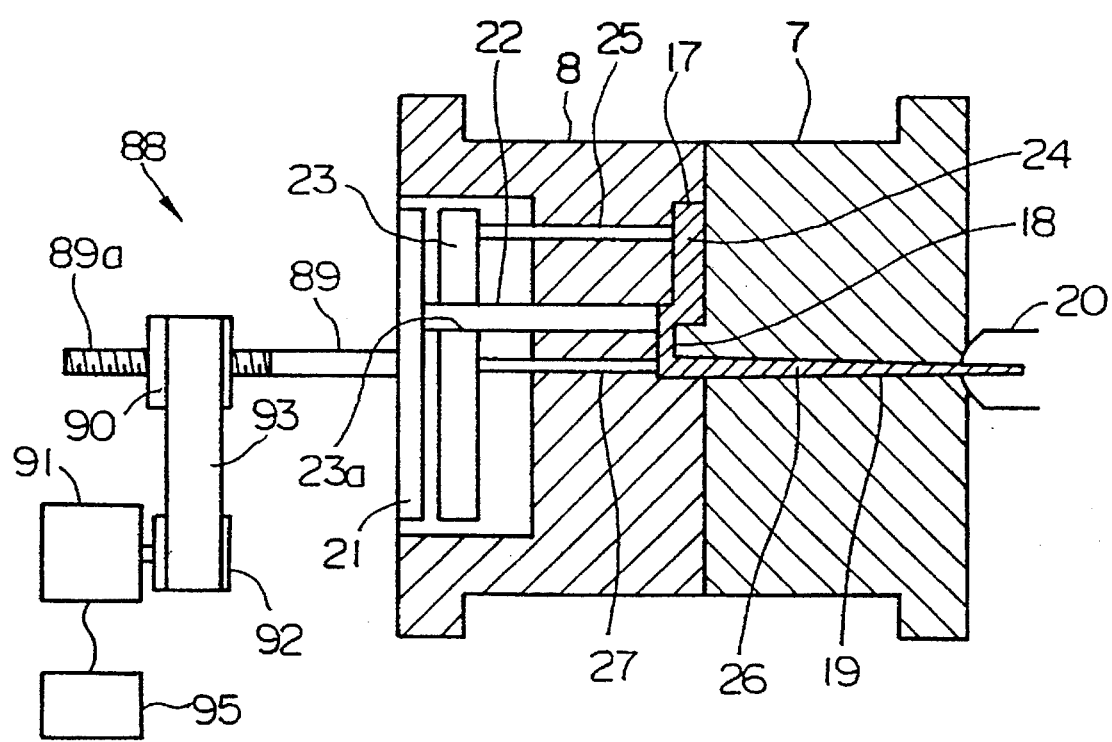
FIG. 16 is a cross section illustrative of the metallic mold portion with resin filled in the electric injection molding machine according to the third embodiment of the present invention.
Figure 17:
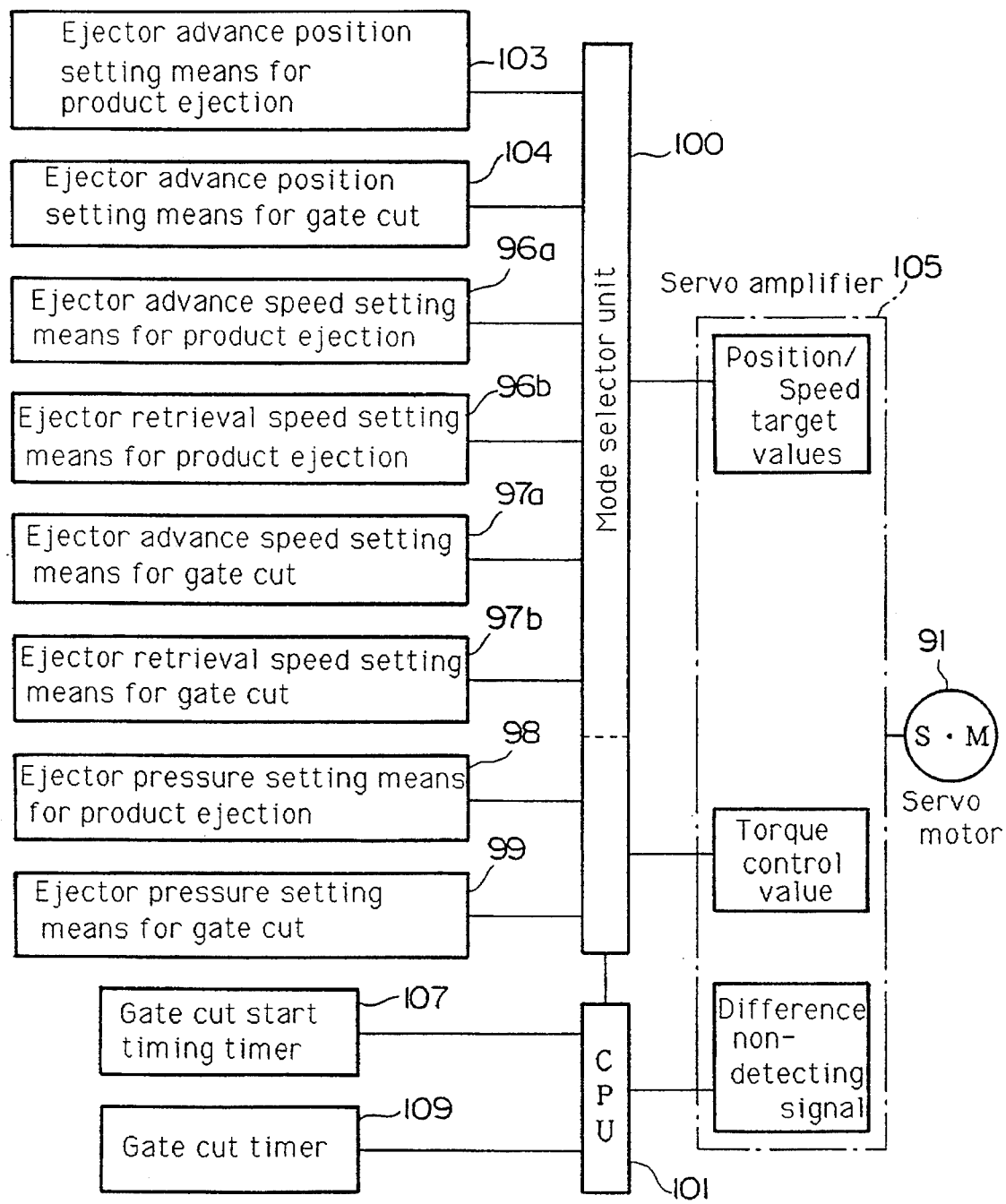
FIG. 17 is a block diagram of essential components of the control unit of the electric injection molding machine of FIG. 16.

FIG. 16 is a cross section of the metallic molds of an injection molding machine according to the third embodiment. FIG. 17 is a block diagram of essential components of a control unit of the injection molding machine of FIG. 16. FIG. 18 through FIG. 21 show cross sections of the metallic mold portion in the course of gate cut and product ejection.

In FIG. 16 which is the cross section of the metallic mold portion of the injection molding machine, the first eject panel 21 in one of the metallic molds is connected to an electric ejector unit 88.

That is, the first ejector panel 21 is provided with an ejector rod (ball screw) 89 extending in the operation direction of the first ejector panel 21 opposing to the gate cut pin 22. A thread portion 89a is formed on the ejector rod 89. A first pulley (ball bearing) 90 is mounted on the thread portion 89a of the ejector rod 89 through a threaded hole (not depicted) at the center thereof.

The ejector rod 89 is driven by a controllable electric motor, for example, a servo motor 91, whose output axis is provided with a second pulley 92 coaxially mounted thereon so as to rotate as a single block with the axis. The second pulley 92 is connected to the first pulley 90 through a timing belt 93. Thus, the drive force of the servo motor is transmitted to the ejector rod 89 in such a manner that the ejector rod 89 is shifted in a linear movement in the longitudinal direction by the normal and reverse rotation of the servo motor 91.

The servo motor 95 is connected to a control unit 95 which controls at least two stages of rotation speed so as to operate the ejector rod 89 at a sufficiently high speed so that no gate trace will remain on the cut surface after a gate cut and at a sufficiently low speed so that no cracks will be generated during a product ejection.

The operation of the ejector rod 89 can be controlled through control of speed, torque, and rotation amount (shift amount) of the servo motor 91.

Figure 22:
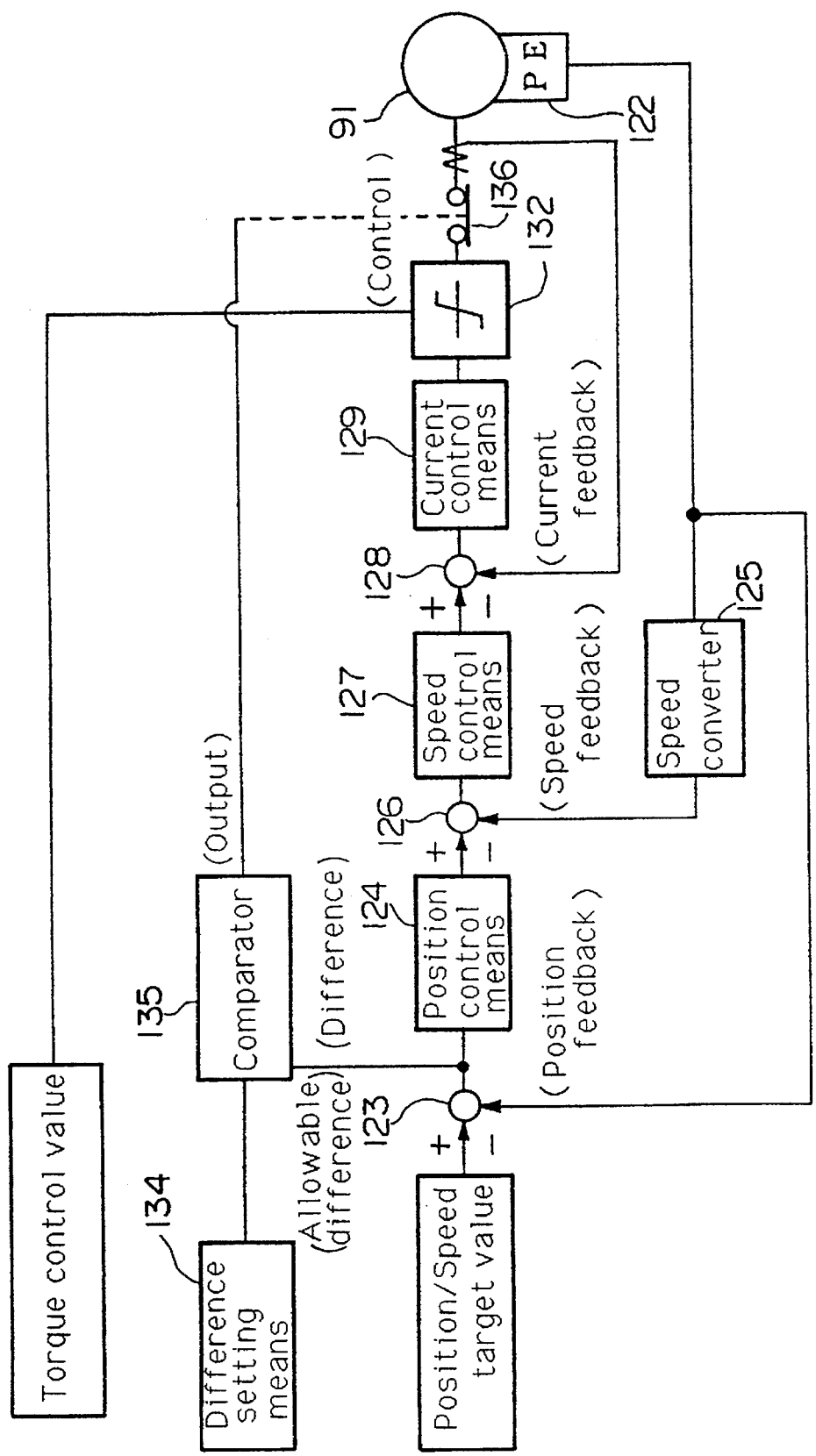
FIG. 22 is a control block diagram of a servo motor according to the third embodiment.

FIG. 22 is a control block diagram comprising the control unit 95 for operating the ejector rod 89 by using the servo motor 51.

The control unit 95 is used to set a target position (stroke distance) and speed for gate cut and product ejection by the ejector rod 89 (i.e., the gate cut pin 22, the first and the second ejector pins 25 and 27).

When the servo motor 91 is driven for a gate cut or a product ejection, a pulse indicating a rotation amount (shift amount) of the servo motor 51 is fed back from a pulse encoder 122 provided on the servo motor 91. A position signal indicating the position is supplied to a calculator 123 and compared as signal indicating an actual position (stroke) with the the value of the target position so as to calculate a difference (between the target position and the actual position). The obtained difference is used by position control means 124 to control the actual position (motor rotation amount) so as to reach the target position.

A rotation speed signal fed back from the pulse encoder 122 is converted into an actual operation speed by a speed converter 125. The actual speed obtained is compared to the target value by a calculator 126 so as to obtain a difference. The difference obtained is used by speed control means 127 so that the actual speed reaches the target speed.

The electric current value (torque) supplied to the servo motor 91 is fed back to the calculator 128 so as to be compared to the electric current value (torque) which has been set by the position control means 124 and the speed control means 127 so as to obtain a difference. The difference is then converted into a corresponding drive current value (torque) by current control means 129. The current is controlled by a control circuit 132 not to exceed the torque regulation value which has been set by the control unit 121 and is supplied as a servo motor drive current to the servo motor 91.

The calculator 123 calculates a position (rotation) difference between the target position value and the actual position value. Subsequently, a comparator 135 compares the difference calculation result with a predetermined allowance (fixed) set by difference setting means 134. If the actual difference is found to exceed the allowance, a judgement is made that an error has occurred in the operation of the ejector rod 89, the gate cut pin 22, or the first and the second ejector pins 25 and 27. The comparator 135 produces a signal to turn off a switch 136 connecting the control circuit 132 to the servo motor 51 so as to stop the operation of the servo motor 91, thus preventing dangerous accidents.

FIG. 17 is a block diagram of the control unit 95 of the electric injection molding machine according to the third embodiment of the present invention which will be described below.

The control unit 95 comprises ejector advance speed setting means 96a and ejector retrieval speed setting means 96b both for product ejection, ejector advance speed setting means 97a and ejector retrieval speed setting means 97b both for gate cut, ejector pressure setting means 98 for product ejection, and ejector pressure setting means 99 for gate cut, each of which means is connected to a mode selector unit 100. The mode selector unit 100 is connected to a CPU 101 of the injection molding machine.

By these components, the operation speed of the ejector rod 89 for gate cut is set to be higher than the operation speed of the ejector rod 89 for product ejection, i.e., at a sufficiently high speed for gate cut so that no gate trace will be left by the gate cut pin 22 and at a sufficiently low speed for product ejection so that no crack will be generated.

The control unit 95 also comprises first ejector advance position setting means 103 for setting an advance target position of the ejector rod 89 for a product ejection and second ejector advance position setting means 104 for a gate cut, each of which means is connected to the mode selector unit 100.

The mode selector unit 100 is further connected through a servo amplifier 105 to the servo motor 91.

As illustrated in the control block diagram of FIG. 22, the servo amplifier 105 is supplied with the advance target position and speed of the ejector rod 89 and the torque control value which are selected by the mode selector unit 100 in accordance with a gate cut or a product ejection so as to control the rotation speed and the rotation amount of the servo motor 91 as well as the torque.

Moreover, the CPU 101 is connected to each of a gate cut start timing timer 107 and a gate cut continuation timer 109. The gate cut start timing timer is triggered normally by one of the following triggers: detection of the screw position, counting of the injection time, and combination of the both.

When a gate cut trigger selected is matched with a set position of gate cut start timing, a signal is sent to start gate cut operation and to start counting of a gate cut time.

The third embodiment constructed as thus far has been described is controlled by a control method which will now be described below with reference to FIG. 16 and FIG. 18 through FIG. 21 according to the flow of a gate cut and a product ejection.

As illustrated in FIG. 16, when the two metallic molds 7 and 8 of the electric injection molding machine are in a closed state, melted resin is injected through the nozzle 6 from the heating cylinder by the operation of the injection cylinder (not depicted) into the sprue 19, gate 18, and the cavity 17 until they are filled with the melted resin.

In the case when the gate cut start timer 107 is to be triggered by detection of the screw position, for example, the corresponding detection signal is supplied to the CPU 101.

Subsequently, the CPU 101 produces a gate cut start signal to the mode selector unit 100.

In the case when the counting of the injection time has been selected as the trigger of the gate cut start timing, the above-described operation is replaced by the counting of the injection time. In the case when the combination of the injection time counting and the screw position detection has been selected as the gate cut start timing trigger, the injection time counting is carried out in addition to the above-described operation.

When the gate cut start signal is supplied from the CPU 101 to the mode selector unit 100, signals from the gate cut ejector advance position setting means 103, the gate cut ejector advance speed setting means 97a, and the gate cut pressure setting means are selected for supply to the servo amplifier 105, and the servo motor 91 is driven according to these signals.

Drive of the servo motor 91 is controlled according to the control block diagram in FIG. 22. That is, an output from the servo motor 91 is fed beck from a pulse encoder 122 as a pulse signal. For each time interval, the target values of the position and the speed are compared to the actual values detected, and the servo motor drive current (torque) is controlled so as to match each of the actual values with the corresponding target values.

Thus, the servo motor 91 is driven, being controlled in the rotation amount (shift amount), speed, and torque thereof.

The rotation of the servo motor 91 thus controlled by the control unit 95 is transmitted from the second pulley 92 which rotates together with the servo motor 91, through the timing belt 93 to the first pulley 90. The rotation of the first pulley 90 is converted into a linear movement of the ejector rod 89 by the ball screw mechanism so as to push the first eject panel 21. Thus, the advance speed of the ejector rod 89 for a gate cut is set at a high speed preferable for carrying out the gate cut.

Figure 18:
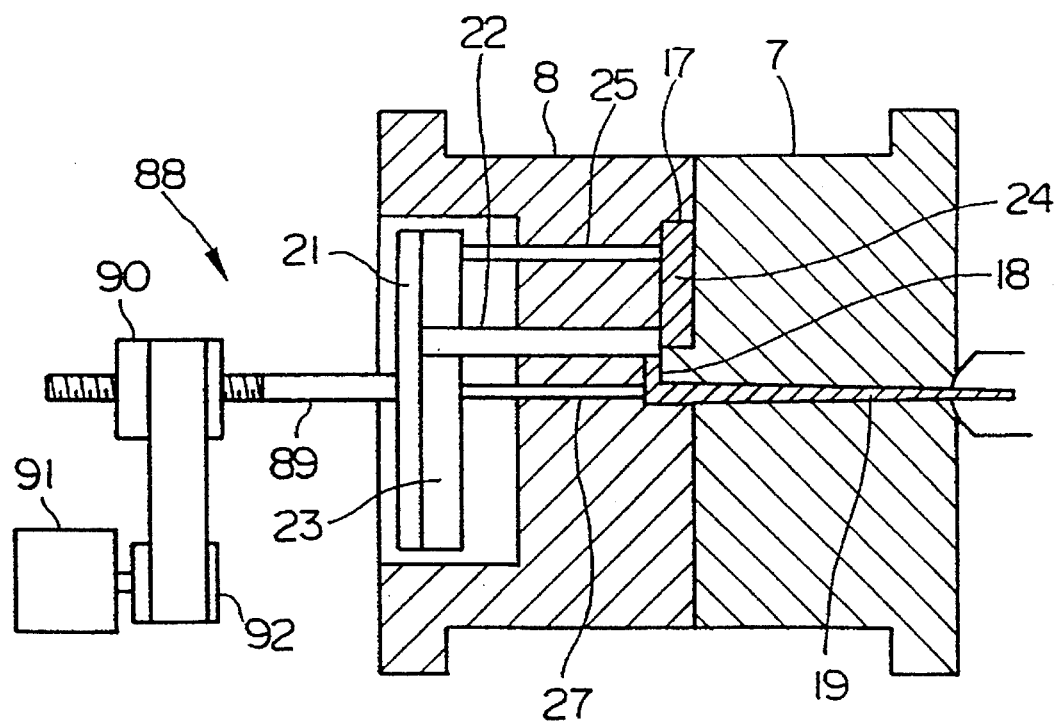
FIG. 18 is a cross section of the metallic mold portion of the third embodiment during gate cut.

In this way, immediately after the resin filling is completed or while a pressure is applied, the gate cut pin 14 together with the first eject panel 21 advances at a comparatively high speed to crush the gate 18 and its end is positioned on the surface of the cavity 17 (see FIG. 18). In this position, the first eject panel 21 stops in the abutment with the second eject panel 22, completing the gate cut.

Figure 19:
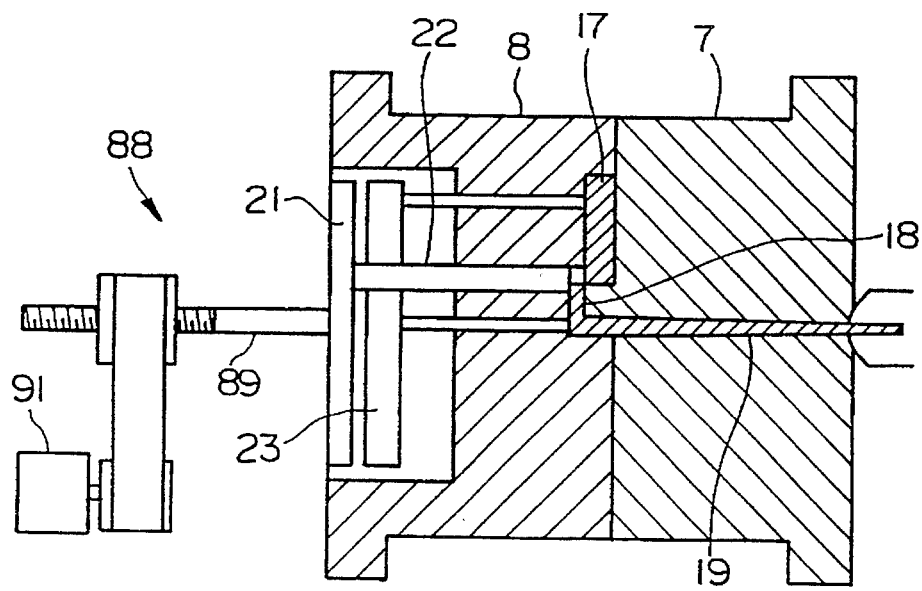
FIG. 19 is a cross section of the metallic mold portion of the third embodiment with the gate cut pin returned to its initial position after a gate cut.
Figure 20:
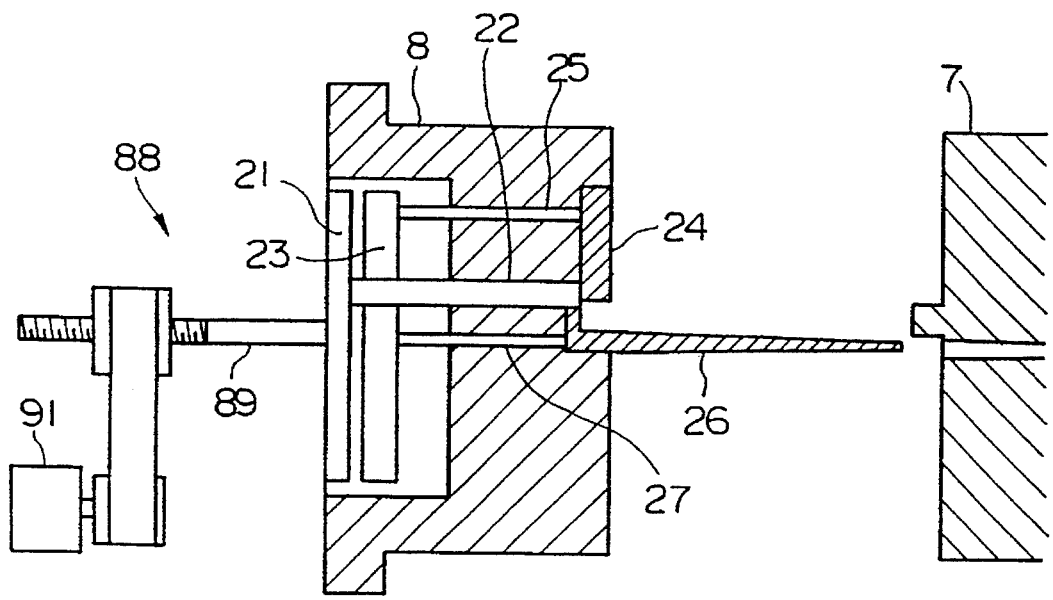
FIG. 20 is a cross section of the metallic mold portion of the third embodiment in open state.

After the time counted by the gate cut timer 109 has passed, the mode selector unit 100 is supplied with signals from the gate cut ejector retrieval speed setting means 97b and the gate cut ejector pressure setting means 99 so that the ejector rod 89 retrieves, returning the first eject panel 21 and the gate cut pin 22 to their initial positions illustrated in FIG. 19.

Subsequently, after a predetermined cooling time has passed, the opening of the metallic molds starts (see FIG. 21). When the opening is complete, the mode selector unit 100 supplied with signals from the ejector advance position setting means 103, the ejector advance speed setting means 96a, and the ejector pressure setting means 98 for a product ejection, specifies the target position (shift amount) and speed of the servo motor 91 so as to drive/control the servo motor 91. Thus, the ejector rod 89 is actuated and the first eject panel 21 is pushed for a long stroke at a lower speed than for the gate cut, so as to push the second eject panel 23.

Figure 21:
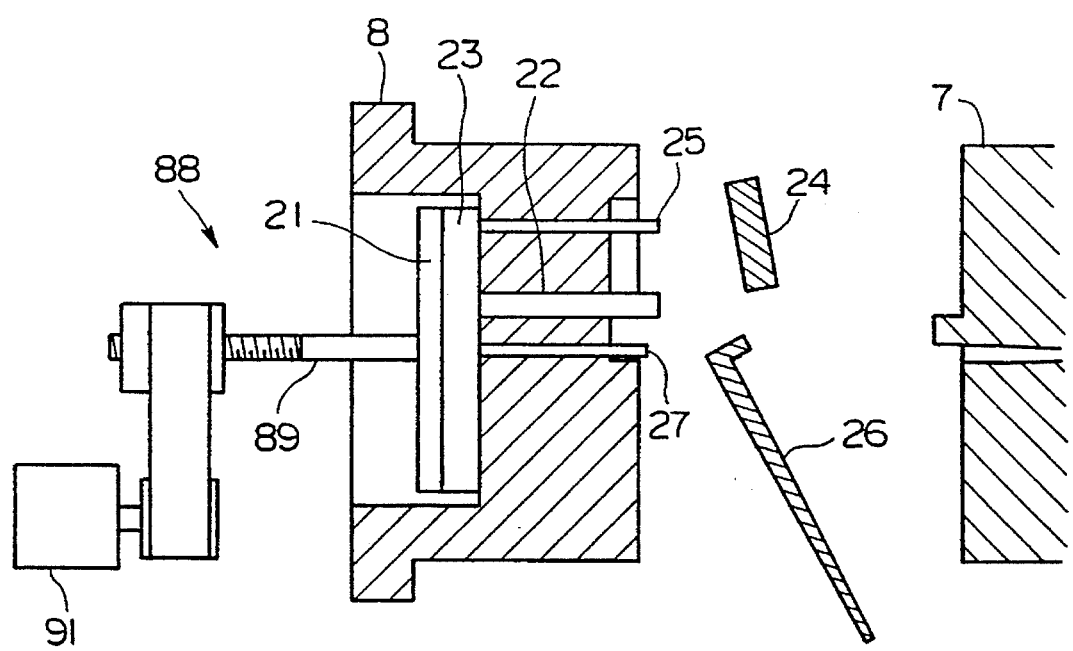
FIG. 21 is a cross section of the metallic mold portion of the third embodiment in an eject state.

Simultaneously with the ejection of the product 24 by the gate cut pin 22 and the first eject pin 25, the sprue runner 26 is ejected from the metallic molds by the second eject pin 27 (see FIG. 21).

The mode selector unit 100 is supplied with signals from the ejector retrieval speed setting means 96b and the ejector pressure setting means 98 for product ejection and sends a signal to retrieve the ejector rod 89. Simultaneously with this, the first eject panel 21 and the second eject panel 23 are returned to their initial positions as illustrated in FIG. 16 (see FIG. 16).

As has thus far been described, the third embodiment of the present invention makes it possible to set the operation speed of the ejector rod 89 (i.e., the speed and torque of the servo motor 91) for gate cut, at preferable speed and torque values, which are higher than the values set for ejection of the product 24 and the sprue runner 26. Moreover, gate cut can be carried out by operating the gate cut pin 22 at a high speed preferable for carrying out the gate cut so that no gate trace will remain on the gate cut surface. This also reduces the time required for the gate cut step. As for ejection of the product 24 and others, the pins 22, 25, and 27 are operated at a lower speed preferable for ejection so that no cracks will be generated during the ejection.

Furthermore, according to this third embodiment, it is possible to carry out both gate cut and product ejection at preferable speeds, respectively, using the conventional electric injection molding machine having no additional novel structure, only by controlling the drive speed, torque, and rotation amount of the servo motor 91 in multiple stages.

Figure 25:
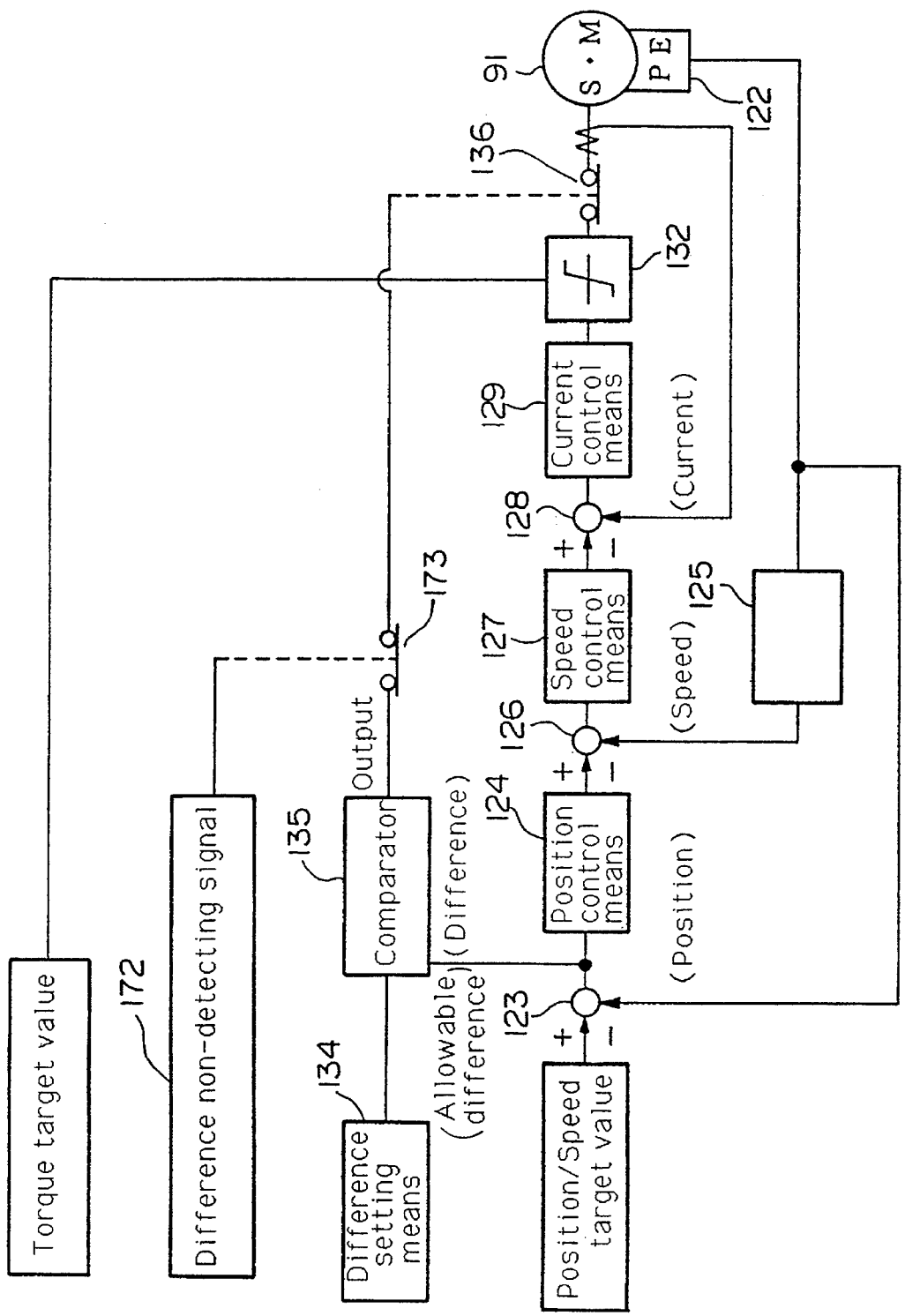
FIG. 25 is control block diagram of a servo motor of a control unit according to a fourth embodiment.

Description will now be directed to a fourth embodiment of the present invention with reference to FIG. 25. FIG. 25 is a control block diagram of the servo motor of the control apparatus according to the fourth embodiment of the present invention.

Figure 23:
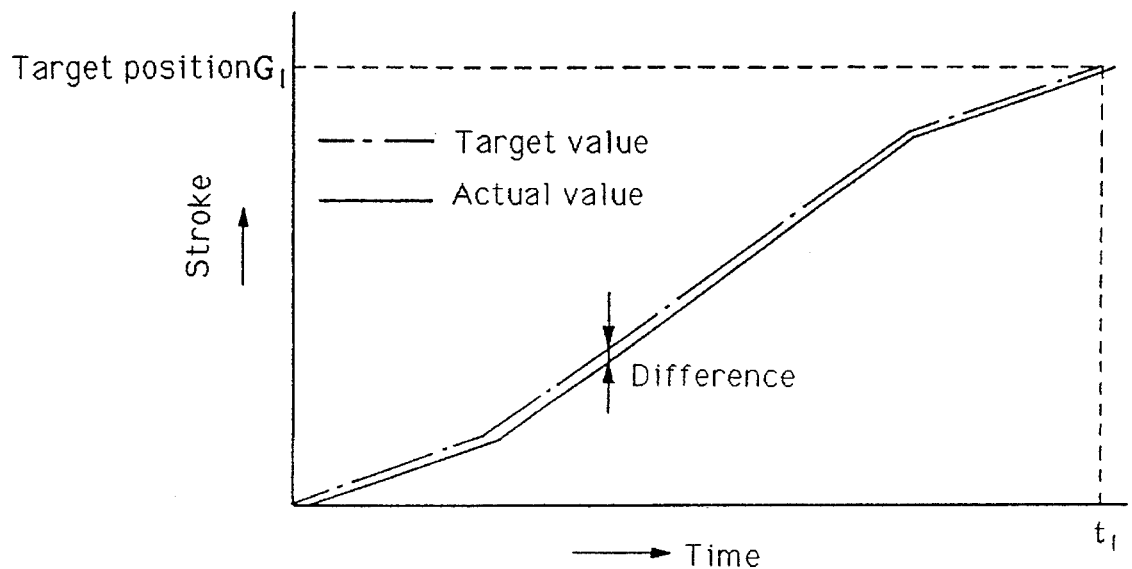
FIG. 23 is a chart showing the control values and the actual values of the stroke of the ejector pin (ejector rod) against time during a product ejection according to the third embodiment.
Figure 24:
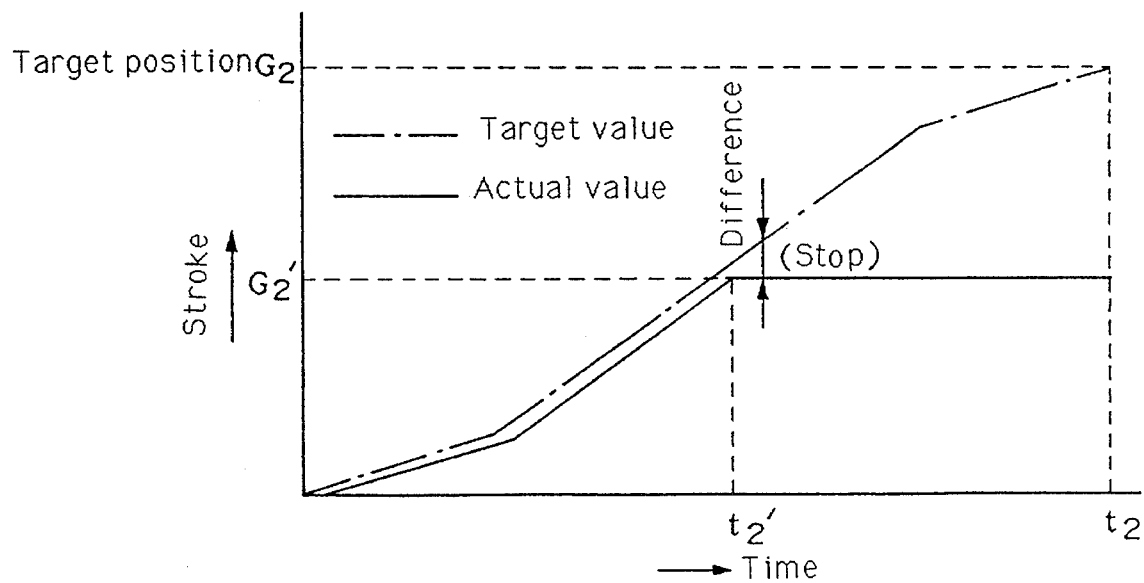
FIG. 24 is a chart showing the control values and the actual values of the stroke of the ejector pin (ejector rod) against time during a gate cut or an abnormal state.

FIG. 23 is a graph showing a target value and an actual value of the ejector rod stroke varying in the course of time during a product ejection. FIG. 24 is a graph showing a target value and an actual value of the ejector rod stroke varying in the course of time during a gate cut.

According to the above-described third embodiment, a product ejection is set by the ejector advance position setting means 103, the ejector advance speed setting means 96a, and the ejector pressure setting means 98 with reference to a predetermined shifting amount (rotation amount) and a speed so as to vary according to the time between the initial position and the target position as indicated by an alternate long and short dash line in FIG. 23.

On the contrary, the solid line in the Figure indicates the actual value of the stroke of the ejector rod 89 varying according to the time, being controlled by the drive control method of the servo motor 91 using the control unit 96 according to the fourth embodiment. The actual value is controlled so as to vary approximately along the control value, finally reaching the target value G1 at the time t1.

During a gate cut, the actual stroke value is controlled so as to reach the target value (control value) G2. However, the actual value stops at the position G2' when the first eject panel 21 is brought into abutment with the second eject panel 23. FIG. 24 shows the control value and the actual value shown by an alternate long and short dash line and a solid line, respectively.

In either case, control is carried out so as to stop the servo motor 91 if a predetermined allowance is exceeded by the difference between the control (target) value and the actual value, which is interpreted that the injection molding machine has failed.

In this fourth embodiment, for a gate cut, the advance target position of the ejector rod 89 is set in a manner such that an advance distance exceeds the distance between the first ejector panel 21 and the second ejector panel 23 in their initial positions. This target position is set to a preferred value by the ejector advance position setting means 104.

Moreover, as shown in the control block diagram of FIG. 25, a switch 173 is provided for on-off operation of the line connecting the switch 136 with the comparator 134 which compares the predetermined allowance with the actual difference. Additionally, the CPU 101 is provided with signal output means 172 for producing a different non-detecting signal which automatically turns off the switch 136 when a gate cut is to be carried out.

Thus, a gate cut is completed with the ejector rod 89 operating to bring the first ejector panel 21 into abutment with the second eject panel 23 whereas the servo motor 91 is controlled to continue operation so that the gate cut pin 22 continues pressing the resin within the cavity 17.

The injection molding machine according to the fourth embodiment constructed as described above is controlled as described below.

During a gate cut, outputs from the ejector advance position setting means 104, the ejector advance speed setting means 97a, and the ejector pressure setting means 99 in the control unit 95 are used to set a target position and a speed of the ejector rod 89 and to drive the servo motor 91.

Simultaneously with this, the signal output means 172 automatically produces a difference non-detecting signal so as to turn off the switch 173 provided between the comparator 134 and the motor power off switch 136. Consequently, power supply to the servo motor 91 will not be cut off even if the predetermined allowance is exceeded by the difference calculated in the calculator 123 between the target position and the actual position of the ejector rod 89 determined by a signal pulse indicating a rotation amount of the servo motor 91 which is fed back from the pulse encoder 122 provided on the servo motor 91 during operation thereof.

As the target position of the ejector rod 89 is set by the ejector advance position setting means at a stroke value exceeding a distance between the first eject panel 21 and the second eject panel 23 in their initial positions, the ejector rod does not reach the target position when the first eject panel 21 is brought into abutment with the second eject panel 23. The servo motor 91 is further driven so that the difference between the target value and the actual value grows greater, exceeding the allowable difference, as shown in FIG. 23. The servo motor 91 continues operation until a predetermined time duration set by the gate cut timer 109 expires. Thus, the gate cut pin 22, in a stop state, continues to apply a pressure to the resin in the cavity 17.

Consequently, the present embodiment brings about a preferable finish of the product 24 because the resin is continued to be pressed by the gate cut pin 22 until the gate cut time expires after completion of the gate cut.

In this case, the resin pressure in the cavity 17 can also be increased, if necessary. The gate cut position may vary according to a type or configuration of the molds, but this will not cause any significant problem. That is, although the position of the edge of the gate cut pin 22 is slightly shifted forward or backward against the surface of the cavity 17, no defect will be caused in the product.

As the signal output means 172 does not operate during a product ejection, the actual position can be determined by the rotation amount signal fed back from the servo motor 91. The actual position is compared to the target position, and, if the difference exceeds the allowable difference, an error is detected. As illustrated in the control block diagram of FIG. 25, the comparator 134 produces a signal to cut off the switch 136 so as to stop the servo motor 91.

As has thus far been described, according to the fourth embodiment of the present invention, the target position of the ejector rod 89 for gate cut is set further than the operation stroke of the ejector rod 89 and no error detection signal will stop operation of the servo motor 91 so that a necessary pressure is continued to be applied to to the cavity 17. Thus, it is possible to obtain the product 24 in a preferable condition or state, independently of type or configuration of the molds or the target position which has been set.

Furthermore, the CPU 101 of the control unit 95 automatically controls output and stop of the difference non-detecting signal from the difference non-detecting signal output means 172. Thus, it is possible to carry out gate cut operation which brings about a preferable product, without adding any novel structure.

It should be noted that the above-described fourth embodiment can be applied not only to the injection molding machine according to the third embodiment wherein the gate cut speed is different from the product ejection speed but also to such an injection molding machine wherein the gate cut and the product ejection are carried out at the same speed.

Incidentally, the gate cut pin 22, and the first and the second ejector pins 25 and 27 are all assumed to be ejector pins.

Field of Application

The gate-cut and ejection control apparatus and method according to the present invention can be applied to an injection molding machine so that the gate cut and the ejection are adjusted at their respective optimal speed values.

What is claimed is:

1. A gate-cut and ejection control method which is intended for use in an injection molding machine wherein one or more than one ejector pin are operated by a hydraulic ejector unit to carry out a gate cut in metallic molds and ejection of a product from the metallic molds, said method being characterised in that:

a gate cut is carried out by means for setting a hydraulic ejector unit operation speed for gate cut so as to operate said hydraulic ejector unit for the gate cut and a product ejection is carried out by means for setting a hydraulic ejector unit operation speed for product ejection so as to operate said hydraulic ejector unit for ejection of at least a product from said metallic molds.

2. A gate-cut and ejection control method as claimed in claim 1, wherein said hydraulic ejector unit operation speed set by said means for setting a hydraulic ejector unit operation speed for gate cut is higher than said hydraulic ejector unit operation speed set by said means for setting a hydraulic ejector unit operation speed for product ejection.

3. A gate-cut and ejection control method which is intended for use in an injection molding machine, wherein melted substance is injected into metallic molds by an injection cylinder at a single or multiple stages of speed and pressure set by electromagnetic flow control means and electromagnetic pressure control means and one or more than one ejector pin are operated by a hydraulic ejector unit to carry out a gate cut in said metallic molds and ejection of a product from said metallic molds, said gate-cut and ejection control method being characterised in that:

after filling said melted substance into said metallic molds, said hydraulic ejector unit is supplied with said speed and said pressure set by said electromagnetic flow control means and said electromagnetic pressure control means so that said hydraulic ejector unit is operated at said speed and said pressure for carrying out a gate cut.

4. A gate-cut and ejection control method as claimed in claim 3, wherein said speed and said pressure to be applied to said injection cylinder are cut off at a start of a gate cut so that the gate cut is carried out after a predetermined time has passed.

5. A gate-cut and ejection control method which is intended for use in an injection molding machine wherein one or more than one ejector pin is operated by an ejector member of an electric mechanism for carrying out gate cut in metallic molds and product ejection from said metallic molds, said method being characterised in that:

said ejector member is operated at a comparatively high speed for gate cut and at a comparatively low speed for product ejection from said metallic molds.

6. A gate-cut and ejection control method which is intended for use in an injection molding machine wherein one or more than one ejector pin is operated by an ejector member of an electric mechanism for carrying out a gate cut in metallic molds and a product ejection from said metallic molds, said method being characterised in that:

a gate cut is carried out by switching off error detecting means which cuts off a drive source if a difference between a target position and an actual position of an ejector member for operating said ejector pins exceeds a predetermined allowance; and a product ejection is carried out by switching on said error detecting means.

7. A gate-cut and ejection control method as claimed in claim 6, wherein said ejector member target position for a gate cut is set at a position in which the ejector pin goes further than the gate cut position.

8. A gate-cut and ejection control apparatus which is intended for use in an injection molding machine wherein one or more than one ejector pin are operated by an ejector unit to carry out a gate cut in metallic molds and ejection of a product from the metallic molds, said gate-cut and ejection control apparatus being characterised by means for setting an ejector unit operation speed for a gate cut provided separately from means for setting an ejector unit operation speed for a product ejection.

9. A gate-cut and ejection control apparatus as claimed in claim 8, wherein said ejector unit is operated by a hydraulic pressure.

10. A gate-cut and ejection control apparatus as claimed in claim 9, wherein a hydraulic ejector operation speed set by the hydraulic ejector unit operation speed setting means for gate cut is higher than a hydraulic ejector unit operation speed set by the hydraulic ejector unit operation speed setting means for product ejection.

11. A gate-cut and ejection control apparatus as claimed in claim 8, wherein said ejector unit is driven by an electric mechanism.

12. A gate-cut and ejection control apparatus as claimed in claim 11, wherein said ejector unit comprises a motor, an ejector member for interlock of said ejector pins, and transmission means for transmitting drive force of said motor to said ejector member.

13. A gate-cut and ejection control apparatus as claimed in claim 12, wherein said ejector member operation speed setting means for gate cut comprises ejector advance position setting means, advance speed setting means, and ejector pressure setting means for gate cut.

14. A gate-cut and ejection control apparatus as claimed in claim 13, wherein said ejector member operation speed setting means for product ejection comprises ejector advance position setting means, advance speed setting means, and ejector pressure setting means for product ejection.

15. A gate-cut and ejection control apparatus which is intended for use in an injection molding machine wherein melted substance is injected into metallic molds by an injection cylinder at a single or multiple stages of speed and pressure see by electromagnetic flow control means and electromagnetic pressure control means, and one or more than one ejector pin are operated by a hydraulic ejector unit to carry out a gate cut in said metallic molds and ejection of a product from said metallic molds, said gate-cut and ejection control apparatus being characterised by comprising:

means provided for supplying said hydraulic ejector unit with the speed and the pressure set by said electromagnetic flow control means and said electromagnetic pressure control means after filling said melted substance into said metallic molds so that said hydraulic ejector unit is operated at said speed and said pressure for carrying out a gate cut.

16. A gate-cut and ejection control apparatus as claimed in claim 15, wherein said apparatus comprises:

means which, at a start of a gate cut, cuts off speed and pressure Lo be supplied to said injection cylinder, and means for carrying out a gate cut after a lapse of a predetermined time.

17. A gate-cut and ejection control apparatus which is intended for use in an injection molding machine wherein one or more than one ejector pin is operated by an ejector member of an electric mechanism for carrying out gate cut in metallic molds and product ejection from said metallic molds, said apparatus being characterised by comprising:

error detecting means which cuts off the drive source when a predetermined allowance is exceeded by a difference between an actual position and a target position set for said ejector member for operating said ejector pin; and error control means which switches off said error detecting means when a gate cut is to be carried out, and switches on said error detecting means when a product ejection is to be carried out.

18. A gate-cut and ejection control apparatus as claimed in claim 17, wherein said error detecting means comprises:

a comparator which produces a signal when a predetermined allowance is exceeded by said difference between said target position and said actual position of said ejector member, and a stop switch which cuts off the drive current to be supplied to said motor upon reception of said signal.

19. A gate-cut and ejection control apparatus as claimed in claim 18, wherein said error control means comprises an on-off switch for controlling on and off current between said comparator and said stop switch of said error detecting means.

20. A gate-cut and ejection control apparatus as claimed in one of claim 17 through claim 19, wherein said ejector member target position is set at a position in which the ejector pin goes further than the gate cut position.

21. A gate-cut and ejection control apparatus as claimed in claim 20, wherein said gate cut position is such that a first eject panel having a gate-cut ejector pin is brought into abutment with a second eject panel having a product-ejection pin.

22. In an injection molding machine having a metallic mold, having a gate-cut and ejection control apparatus with an ejector unit with at least one ejector pin to carry out a gate-cut in said metallic mold and ejection of a product from said metallic mold, wherein the improvement comprises said gate-cut and ejection control apparatus being characterized by means for setting an ejector unit operation speed for a gate-cut provided separately from means for setting an ejector unit operation speed for product ejection.

* * * * *

UNITED STATES PATENT AND TRADEMARK OFFICE
CERTIFICATE OF CORRECTION

PATENT NO. : 5,492,658

DATED : February 20, 1996

INVENTOR(S) : Masakazu Ohno; Yukio Yoshizawa; Shoji Miyajima; Sumio Sato; Toshio Inage; and Motohiro Kobayashi It is certified that error appears in the above-indentified patent and that said Letters Patent is hereby corrected as shown below:

On the title page: Item [22]

Insert -- Filed: December 19, 1994"
[86] PCT Filed: April 20, 1994
PCT No.: PCT/JP94/00647
[87] PCT Pub. No.: WO 94/23926
PCT Pub. Date: Oct. 27, 1994 --.

Signed and Sealed this

Ninth Day of July, 1996

Attest:

BRUCE LEHMAN

*Attesting Officer*

*Commissioner of Patents and Trademarks*